US008107968B2

(12) United States Patent
Kasslin et al.

(10) Patent No.: US 8,107,968 B2
(45) Date of Patent: Jan. 31, 2012

(54) RADIO TRANSMISSION SCHEDULING ACCORDING TO MULTIRADIO CONTROL IN A RADIO MODEM

(75) Inventors: Mika Kasslin, Espoo (FI); Niko Kiukkonen, Veikkola (FI); Carl Wijting, Helsinki (FI)

(73) Assignee: Nokia Corporation, Espoo (FI)

( * ) Notice: Subject to any disclaimer, the term of this patent is extended or adjusted under 35 U.S.C. 154(b) by 955 days.

(21) Appl. No.: 11/609,049

(22) Filed: Dec. 11, 2006

(65) Prior Publication Data

US 2008/0137636 A1 Jun. 12, 2008

(51) Int. Cl.
*H04W 72/00* (2009.01)
*H04W 74/00* (2009.01)
*H04W 4/00* (2009.01)
*H04B 7/00* (2006.01)
*H04J 3/16* (2006.01)

(52) U.S. Cl. .............. 455/451; 455/450; 455/452.1; 455/454; 455/455; 455/464; 455/509; 455/516; 370/329; 370/341; 370/346

(58) Field of Classification Search .......... 370/346, 370/329, 341; 455/450–455, 464, 509, 516
See application file for complete search history.

(56) References Cited

U.S. PATENT DOCUMENTS

| 7,046,649 B2* | 5/2006 | Awater et al. ............ 370/338 |
| 2004/0048577 A1 | 3/2004 | Godfrey et al. |
| 2004/0203426 A1* | 10/2004 | Cave et al. ............ 455/67.11 |
| 2004/0223483 A1* | 11/2004 | Cooper ............ 370/347 |
| 2005/0202791 A1 | 9/2005 | Krause |
| 2006/0246885 A1 | 11/2006 | Lee |
| 2007/0058605 A1* | 3/2007 | Meylan et al. ............ 370/346 |
| 2008/0139212 A1* | 6/2008 | Chen et al. ............ 455/450 |
| 2009/0146791 A1* | 6/2009 | Jantunen et al. ............ 340/10.2 |

OTHER PUBLICATIONS

Integrated circuit, http://www.csgnetwork.com/, 1 page.*
International Search Report of PCT/IB2007/003843—Date of Completion of Search: Jun. 6, 2008.

* cited by examiner

*Primary Examiner* — Nick Corsaro
*Assistant Examiner* — Munsoon Choo
(74) *Attorney, Agent, or Firm* — Locke Lord LLP

(57) ABSTRACT

A system for managing the simultaneous operation of a plurality of radio modems in a single wireless communication device (WCD). The multiradio control may be integrated into the WCD as a subsystem responsible for scheduling wireless communications by temporarily enabling or disabling the plurality of radio modems within the device. The multiradio control system may comprise a multiradio controller (MRC) and a plurality dedicated radio interfaces. The radio interfaces are dedicated to quickly conveying delay sensitive information to and from the radio modems. The modems may further include control features that take information from the MRC as an input in determining the priority of messages to be sent out to a receiving device. Uplink and/or downlink operations might, for instance, be performed. Instruction that operation can commence prior to an assigned time period might, for example, be provided. Channel contention might, for instance, be initiated in response to the instruction.

52 Claims, 24 Drawing Sheets

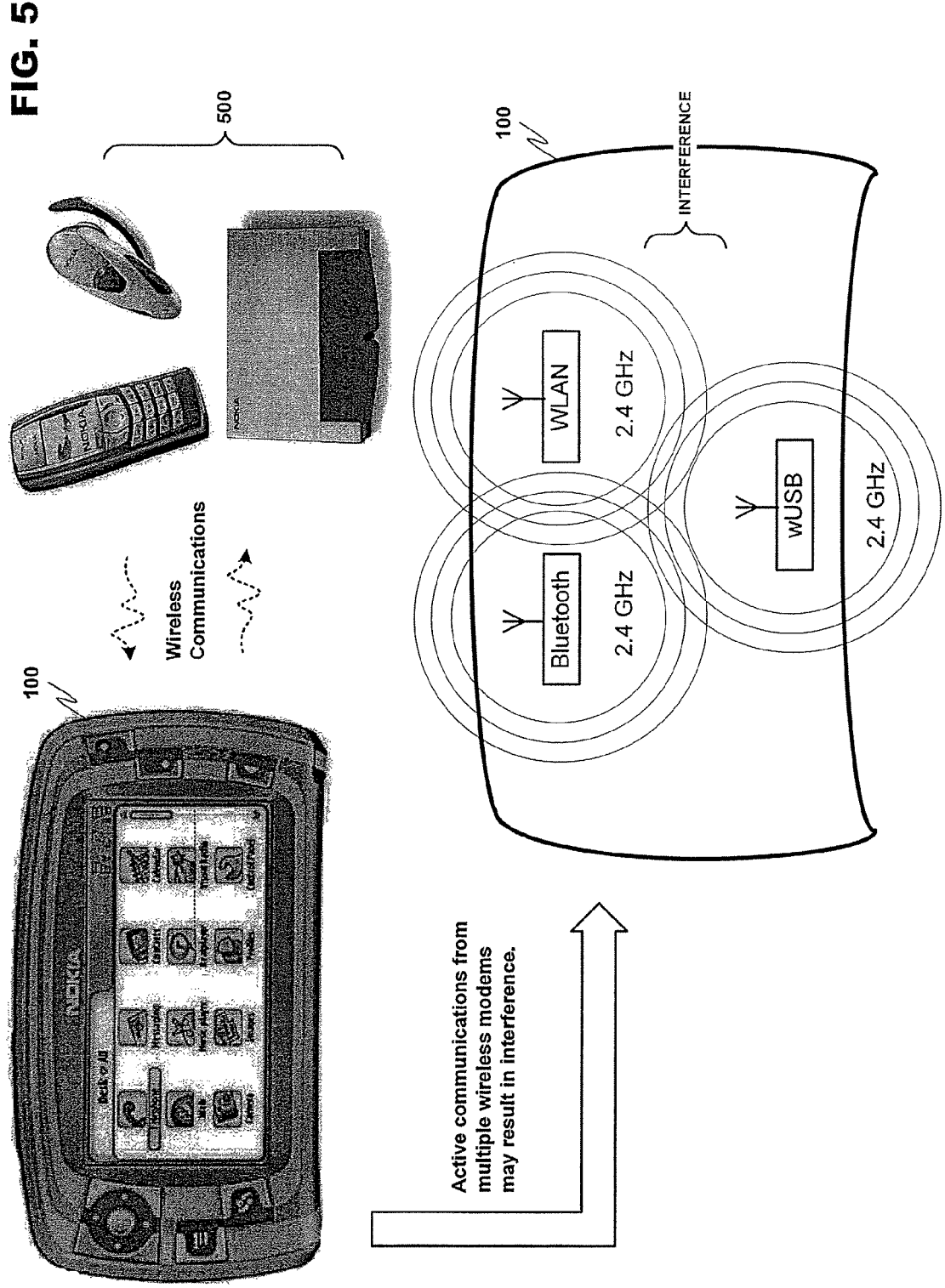

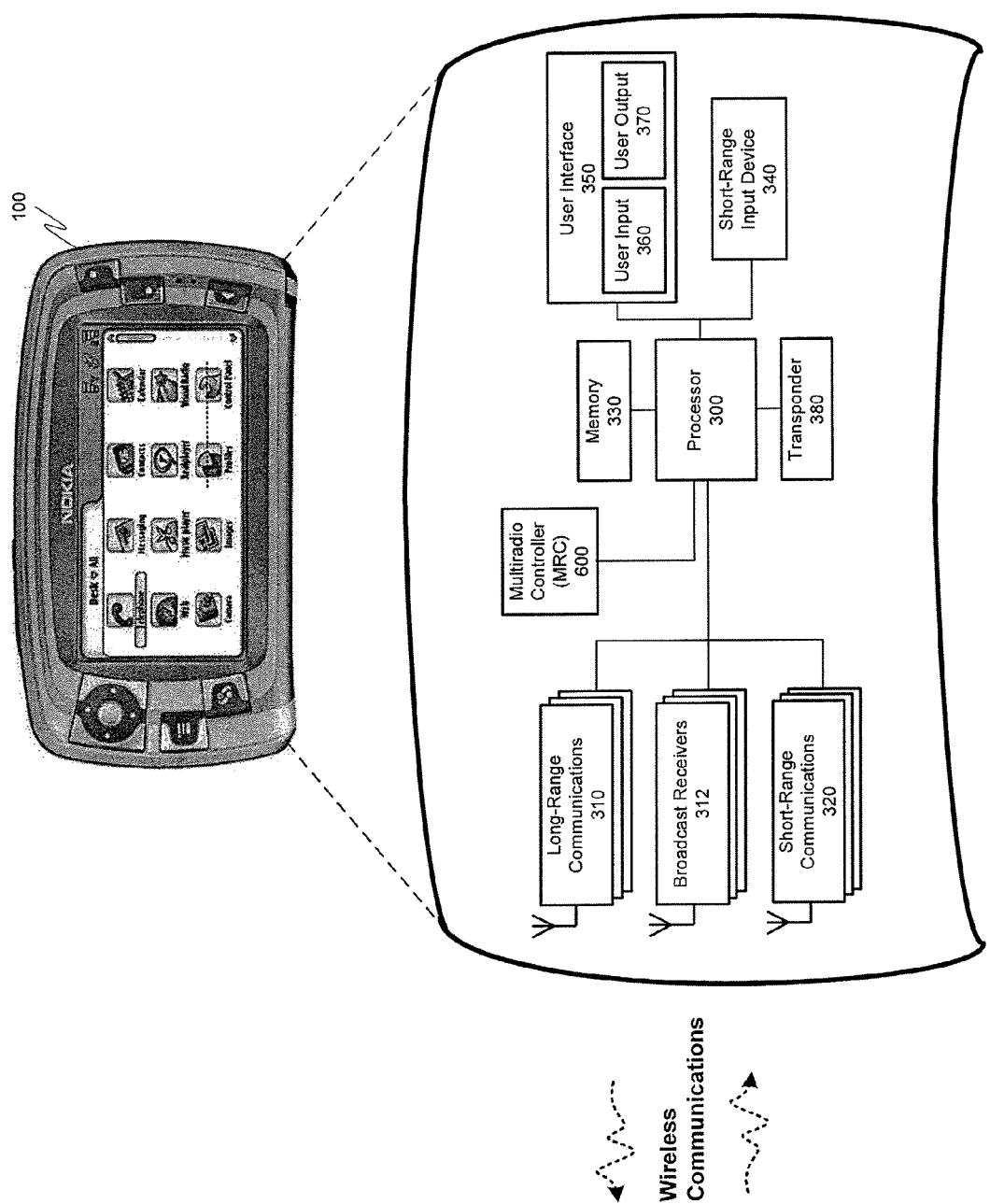

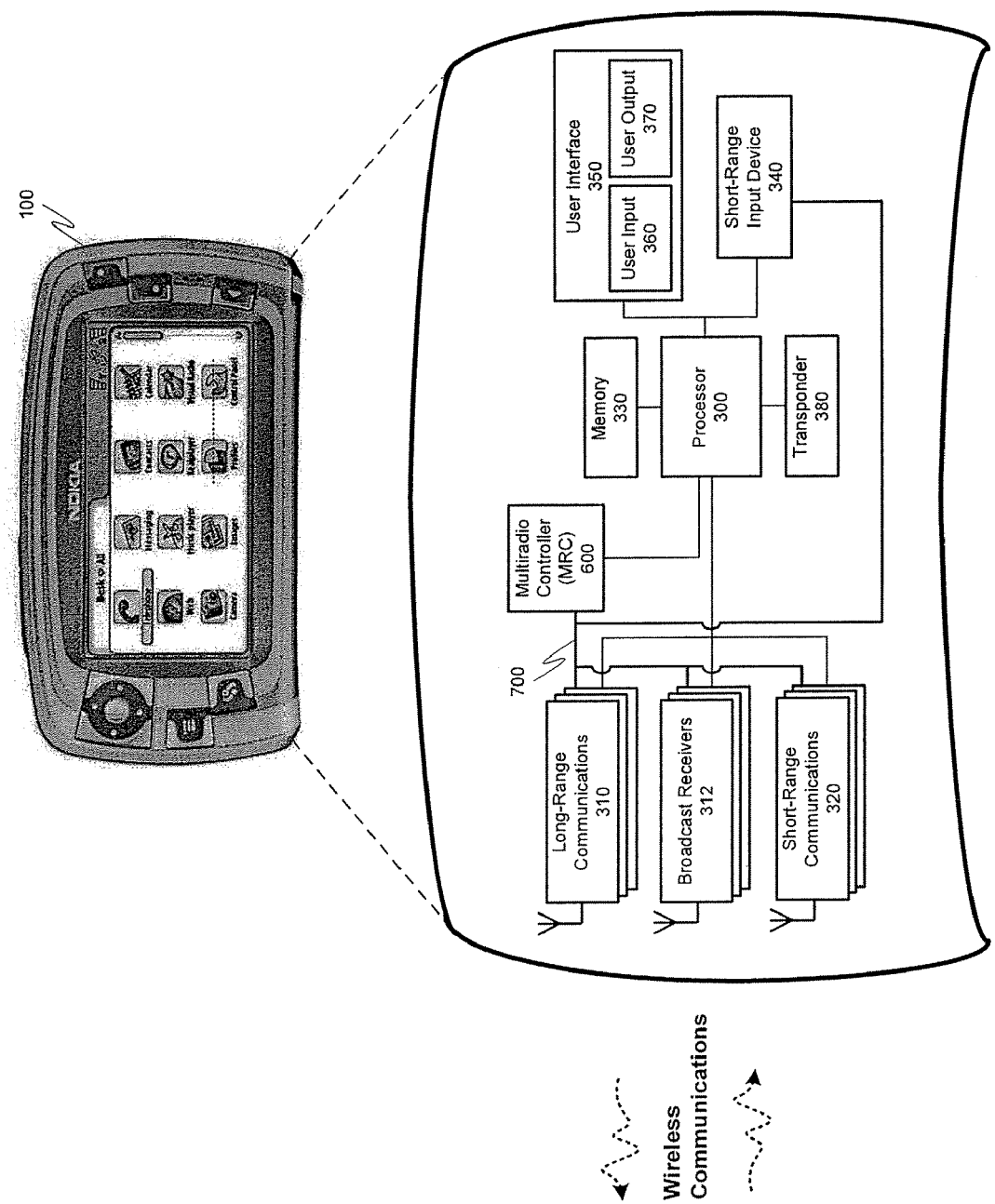

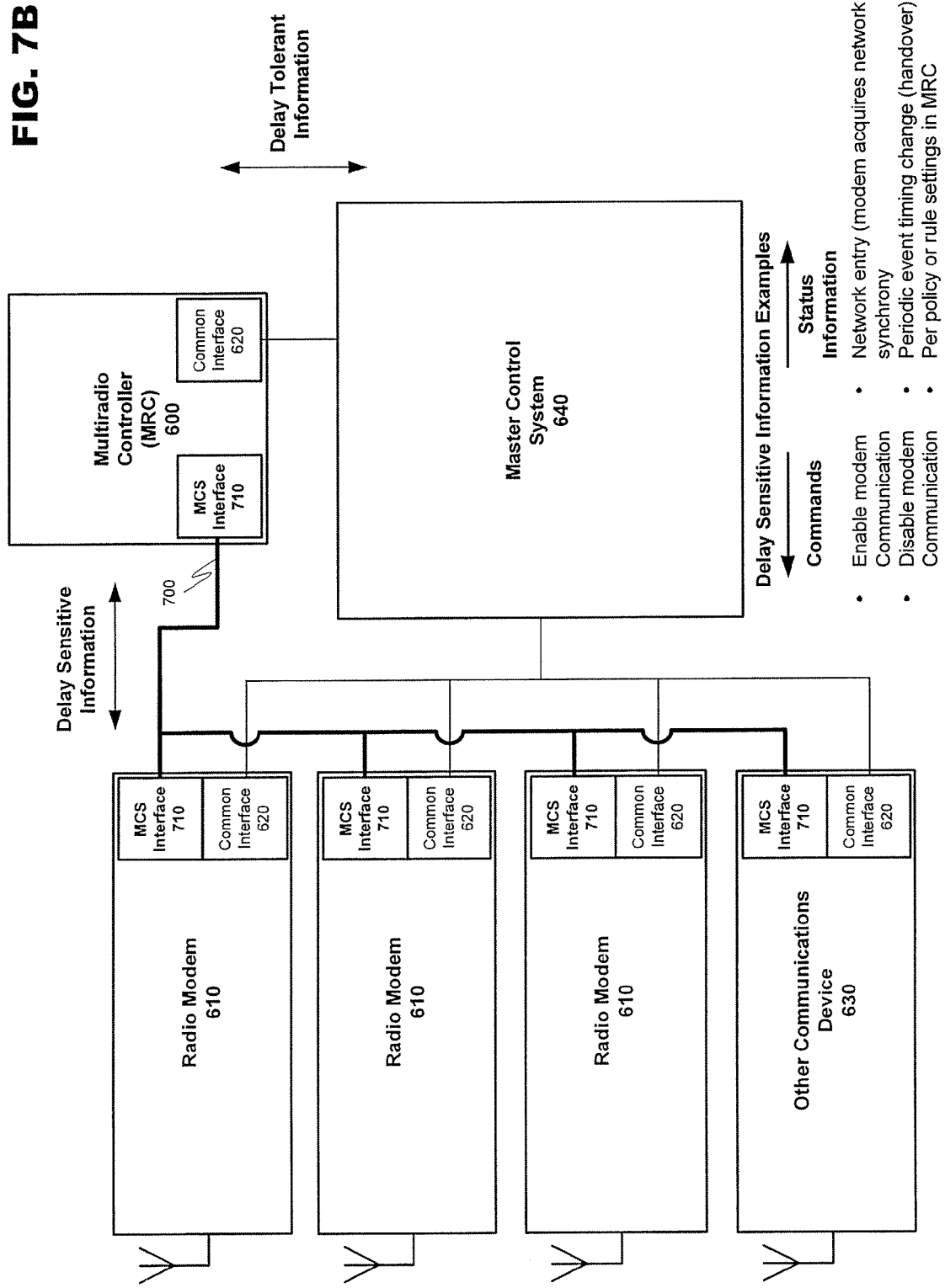

RADIO TRANSMISSION SCHEDULING ACCORDING TO MULTIRADIO CONTROL IN A RADIO MODEM

BACKGROUND OF THE INVENTION

The present invention relates to a system for managing one or more radio modems imbedded in a wireless communication device, and more specifically to a control system for scheduling operation of the one or more active radio modems so as to avoid communication conflicts.

DESCRIPTION OF PRIOR ART

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD may transmit and receive data rates from 720 Kbps up to 2-3 Mbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple mediums for each category. This allows a communication device to flexibly adjust to its surroundings, for example, communicating both with a WLAN access point and a Bluetooth™ communication accessory, possibly at the same time.

Given the large array communications options compiled into one device, it is foreseeable that a user will want to employ a WCD to its full potential when replacing other productivity related devices. For example, a user may use a high powered WCD to replace other traditional, more cumbersome phones, computers, etc. In these situations, a WCD may be communicating simultaneously over numerous different wireless mediums. A user may use multiple peripheral Bluetooth™ devices (e.g., a headset and a keyboard) while having a voice conversation over GSM and interacting with a WLAN access point in order to access an Internet website. Problems may occur when these simultaneous communications cause interference with each other. Even if a communication medium does not have an identical operating frequency as another medium, a radio modem may cause extraneous interference to another medium. Further, it is also possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

The utility of a communication device equipped with the ability to communicate over multiple wireless communication mediums is greatly hindered if these communications can only be employed one at a time. Therefore, what is needed is a system to manage these various communication mediums so that they can function simultaneously with a negligible impact in performance. The system should be able to identify and understand the functionality of each wireless medium, and should be able to quickly react on changing conditions in the environment and control each medium so that interference is minimized.

SUMMARY OF INVENTION

The present invention includes a terminal, method, computer program, system and chipset for managing the simultaneous operation of a plurality of radio modems embedded in the same wireless communication device. The operations of these radio modems may be directly controlled by a multiradio control system also integrated into the same wireless device.

The multiradio control system (MCS) may include at least one multiradio controller (MRC). The MRC may communicate with each radio modem through either a communication interface common to the general control system of the WCD (common interface), or alternatively, it may utilize a specialized interface dedicated to transactions of the multiradio control system (MCS interface). While the common interface may be used to convey information between the MRC and the radio modems, it may suffer from communication delays due to ordinary traffic in the master control system (e.g., traffic from multiple running applications, user interactions, etc.). However, the MCS interfaces directly couple the MRC and communication resources of the WCD, and may allow the quick transmission of delay sensitive operational information and control commands regardless of master control system traffic. Delay sensitive information may be requested by the MRC, or may be provided by one or more of the plurality of radio modems if a change occurs during operation.

The MRC may use both delay tolerant information received from the common interface system, and delay sensitive information received, in some cases, from the dedicated MCS interface system to control overall communications for the WCD. The MRC monitors active wireless communications to determine if a potential conflict exists. In order to avoid a conflict, the MRC may schedule radio modems by directly enabling or disabling them for time periods through commands issued to these radio modems. While any or all of these commands may be sent through the common interface system, the MCS interface system, which is dedicated only to conveying delay-sensitive information, may provide a direct route between the MRC and the radio modems that is immune from any communication overhead caused by other transactions in the master control system.

Further, radio modems in the present invention may use various input information, including the schedule created by the MRC, in order to prioritize information delivery to a remote device. Various control and communication elements within the radio modem may coordinate both with the MRC and the receiving device in order to determine a usable schedule for controlling message packet delivery. Messages sent to the remote device may also be used for control purposes (e.g., for determining when to enter a power saving mode).

Wireless networking (e.g., WLAN) uplink and/or downlink operations might, in various embodiments, be performed. In various embodiments, instruction that a radio modality, at a time prior to start of an assigned communication time period, can commence operations might be provided. Moreover, channel contention might, in various embodiments, be initiated in response to the instruction.

DESCRIPTION OF DRAWINGS

The invention will be further understood from the following detailed description of a preferred embodiment, taken in conjunction with appended drawings, in which:

FIG. 5 discloses an operational example wherein interference occurs when utilizing multiple radio modems simultaneously within the same wireless communication device.

FIG. 6A discloses an exemplary structural description of a wireless communication device including a multiradio controller in accordance with at least one embodiment of the present invention.

FIG. 7A discloses an exemplary structural description of a wireless communication device including a multiradio control system in accordance with at least one embodiment of the present invention.

FIG. 7B discloses a more detailed structural diagram of FIG. 7A including the multiradio control system and the radio modems.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
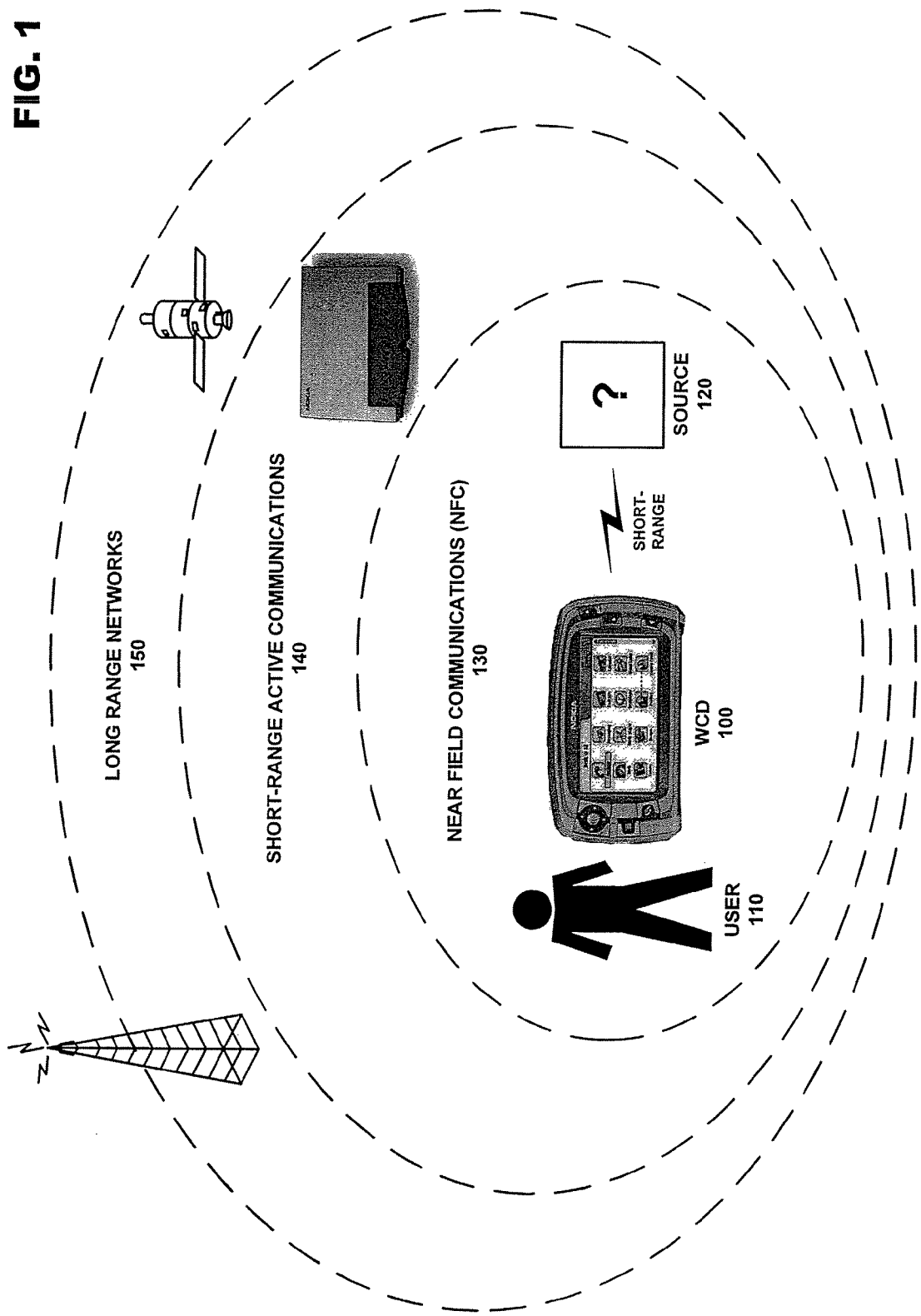
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from 32 ft. to over 300 ft.

Long-range networks 150 are used to provide virtually uninterrupted communication coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

In view of the above, it becomes easy to understand the need for a variety of different communication resources combined into a single WCD. Since these types of devices are being used as replacements for a variety of conventional communications means, including land-land telephones, low-functionality cellular handsets, laptops enabled with wireless communications, etc., the devices must be able to easily adapt to a variety of different applications (e.g., voice communications, business programs, GPS, Internet communications, etc.) in a variety of different environments (e.g. office, automobile, outdoors, arenas, shops, etc.)

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
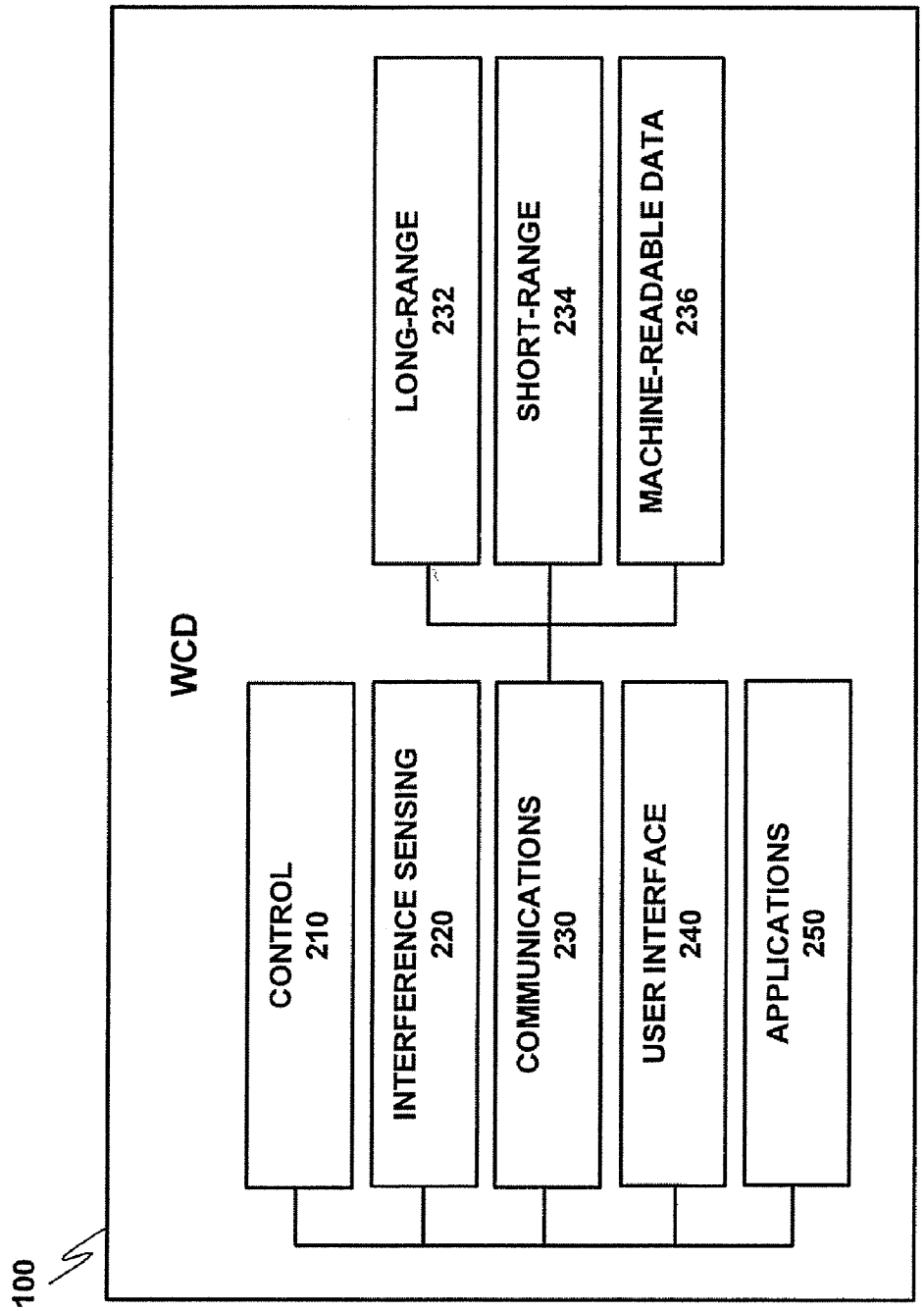
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
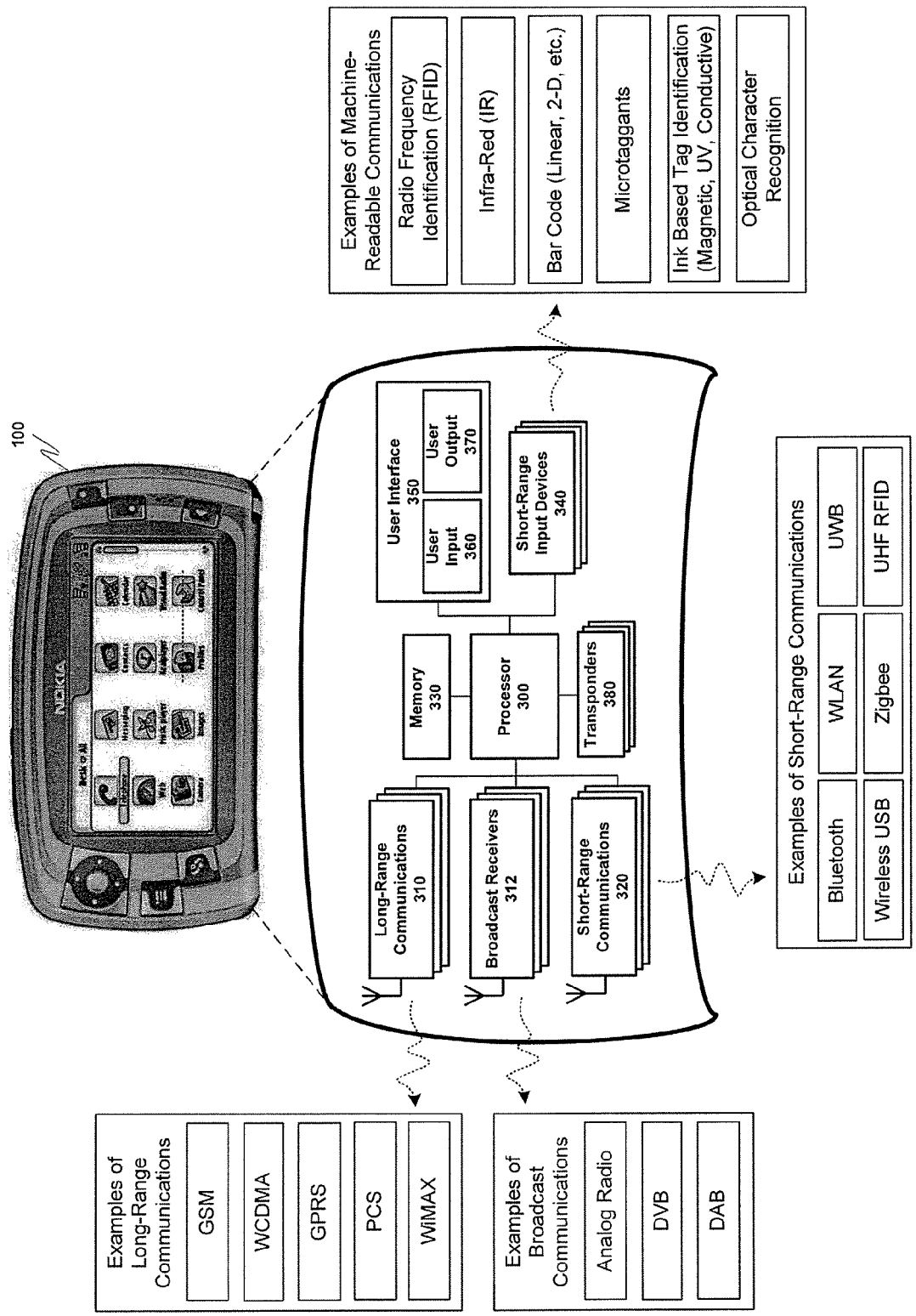
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 312, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 312, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. As disclosed in FIG. 3, Long-range communications 310 may be composed of one or more subsystems supporting various long-range communications mediums. These subsystems may, for example, be radio modems enabled for various types of long-range wireless communication.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, WLAN, UWB, Zigbee, UHF RFID, and Wireless USB connections. Accordingly, short-range communications 320 performs functions related to the establishment of short-range connections, as well as processing related to the transmission and reception of information via such connections. Short-range communications 320 may be composed of one or more subsystem made up of, for example, various radio modems employed to communicate via the previously indicated assortment of short range wireless mediums.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4:
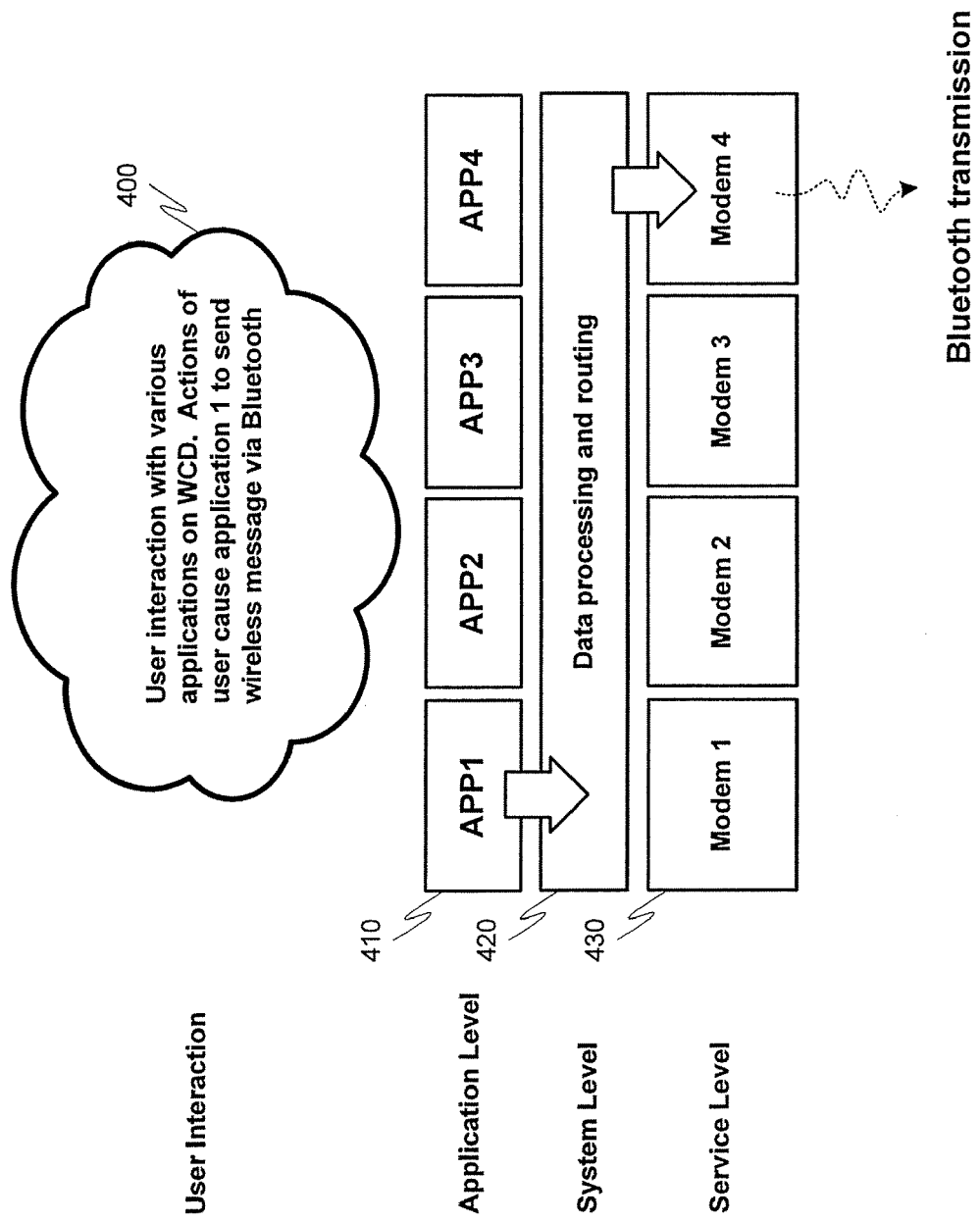
FIG. 4 discloses an exemplary operational description of a wireless communication device utilizing a wireless communication medium in accordance with at least one embodiment of the present invention.

FIG. 4 discloses a stack approach to understanding the operation of a WCD. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of radio modems operating using different wireless mediums. For example, in FIG. 4, radio modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple radio modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communications performance will at least be reduced, if the signal is not lost completely. The present invention, in at least one embodiment, seeks to manage such situations where communications are occurring simultaneously so that anticipated interference is minimized or totally avoided, and as a result, both speed and quality are maximized.

IV. A Wireless Communication Device Including a Multiradio Controller.

In an attempt to better manage communications in WCD 100, an additional controller dedicated to managing wireless communications may be introduced. WCD 100, as pictured in FIG. 6A, includes a multiradio controller (MRC) 600. MRC 600 is coupled to the master control system of WCD 100. This coupling enables MRC 600 to communicate with radio modems or other similar devices in communications modules 310 312, 320 and 340 via the master operating system of WCD 100. While this configuration may in some cases improve overall wireless communications efficiency for WCD 100, problems may occur when WCD 100 becomes busy (e.g., when the control system of WCD 100 is employed in multitasking many different simultaneous operations, both communications and non-communications related).

Figure 6B:
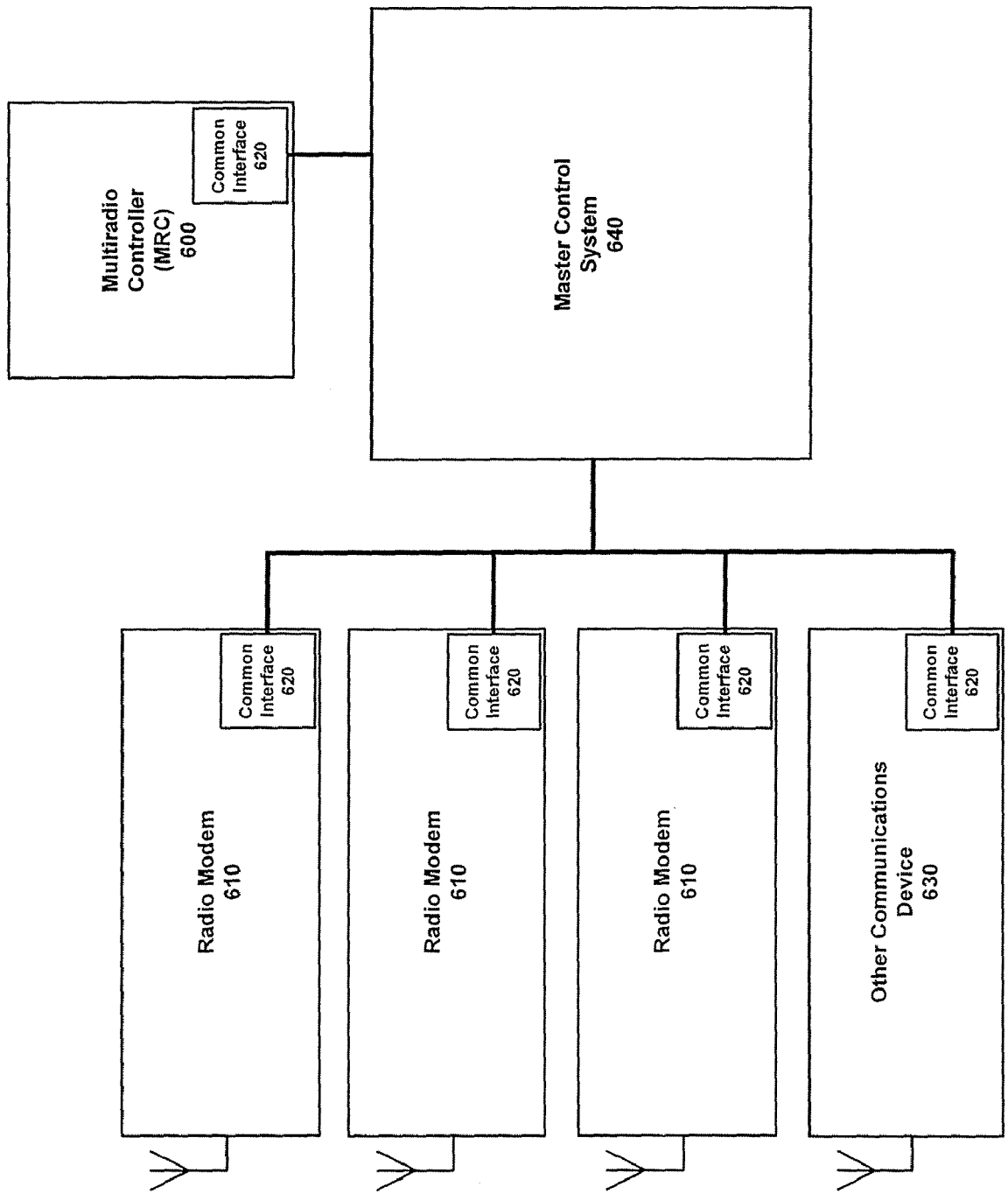
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A. MRC 600 includes common interface 620 by which information may be sent or received through master control system 640. Further, each radio modem 610 or similar communication device 630, for example an RFID scanner for scanning machine-readable information, may also include some sort of common interface 620 for communicating with master control system 640. As a result, all information, commands, etc. occurring between radio modems 610, similar devices 630 and MRC 600 are conveyed by the communications resources of master control system 640. The possible effect of sharing communications resources with all the other functional modules within WCD 100 will be discussed with respect to FIG. 6C.

Figure 6C:
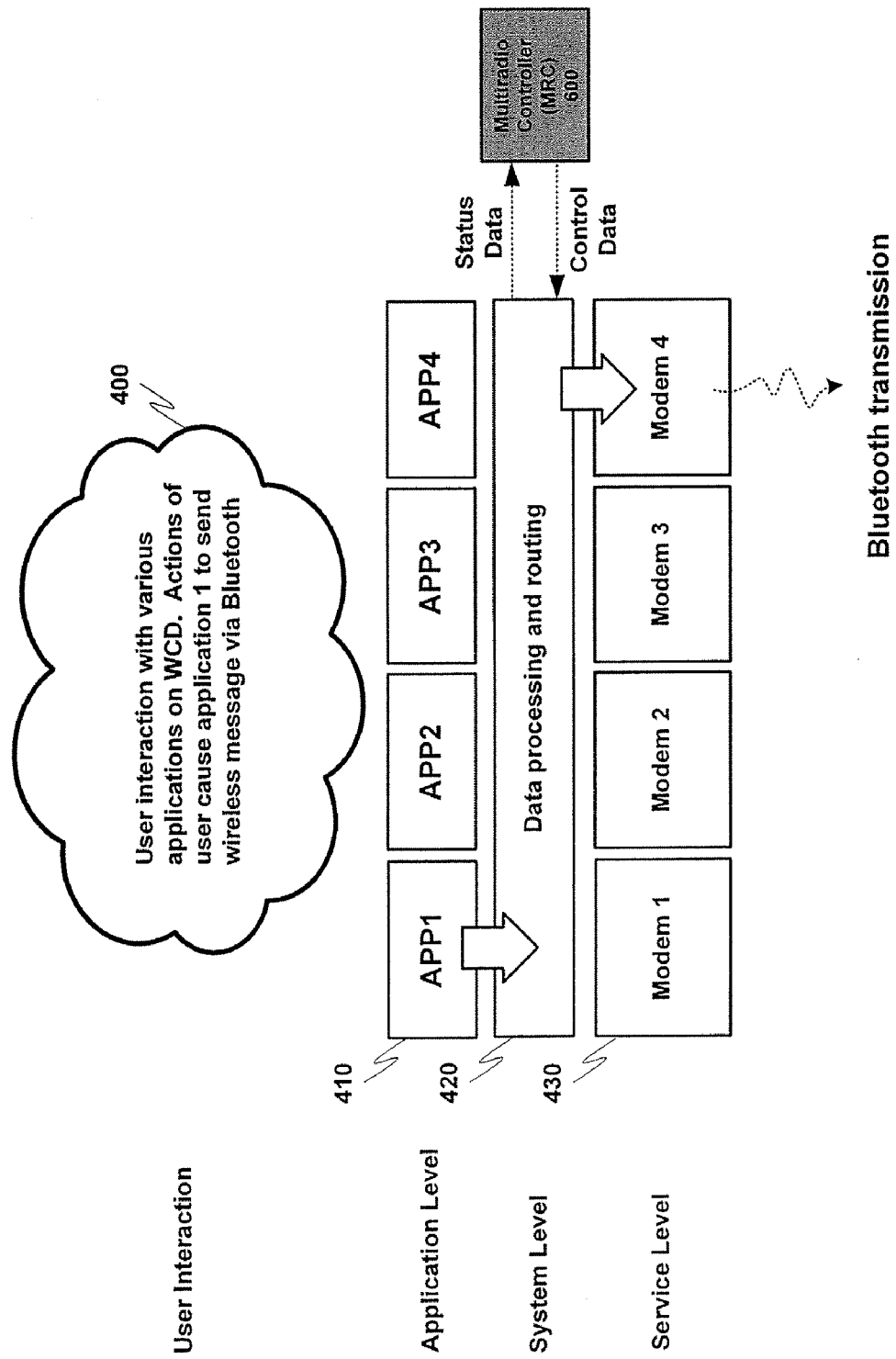
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communications devices in service level 430 and MRC 600 must all share the same communications system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

FIG. 7A introduces MRC 600 as part of a multiradio control system (MCS) 700 in WCD 100. MCS 700 directly links the communications resources of modules 310, 312, 320 and 340 to MRC 600. MCS 700 may provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 720. For example, MCS interface 720 may be coupled to MRC 600. MCS Interfaces 710 may connect radio modems 610 and other similar communications devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

Figure 7C:
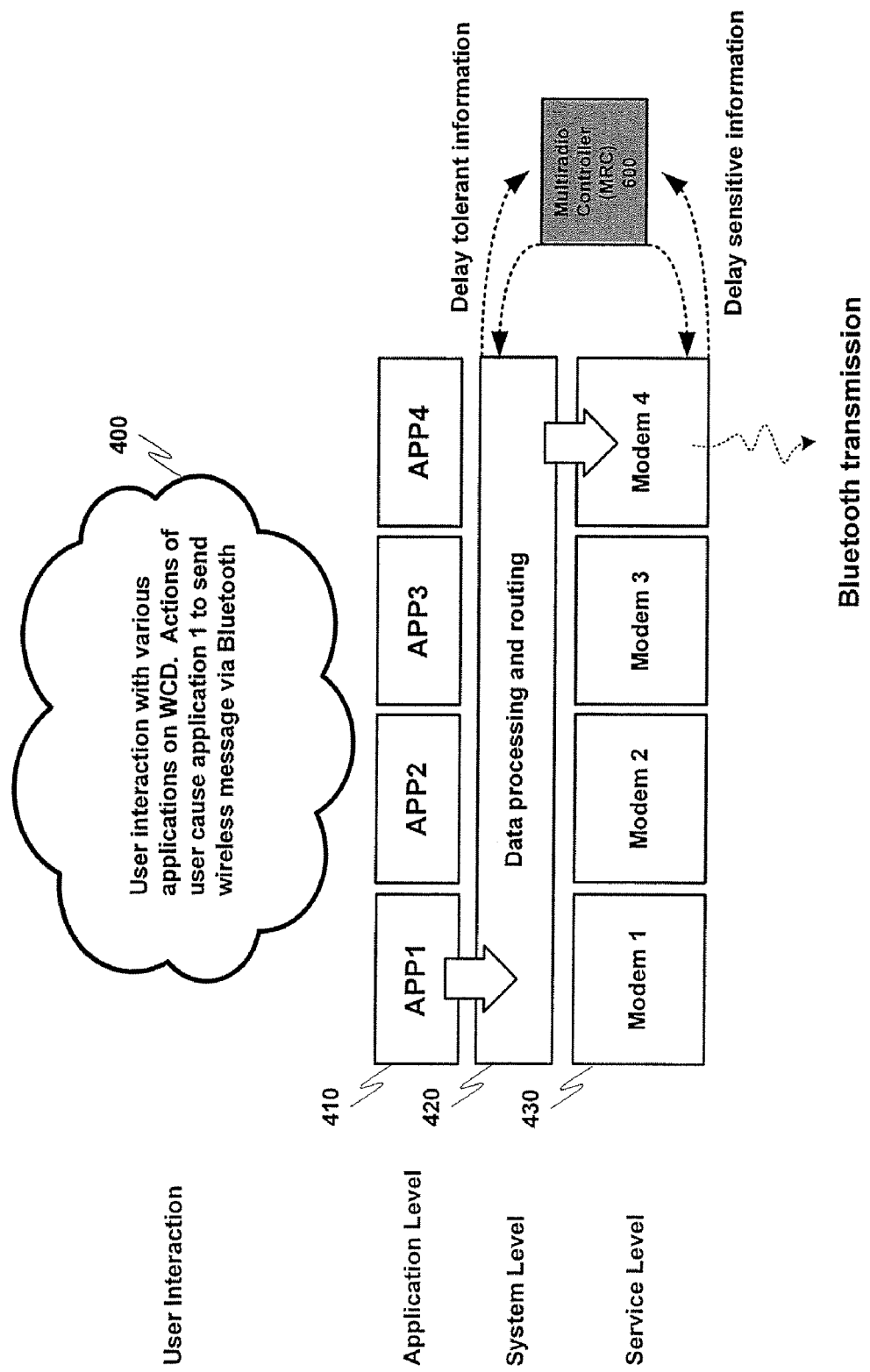
FIG. 7C discloses an exemplary operational description of a wireless communication device including a multiradio control system in accordance with at least one embodiment of the present invention.

The effect of MCS 700 is seen in FIG. 7C. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 720 to MRC 600, and may include radio modem synchronization information. Delay sensitive information may be provided in response to a request by MRC 600, or may be delivered as a result of a change in radio modem settings during transmission, such as due to wireless handover or handoff.

As a part of information acquisition services, the MCS interface 710 needs to send information to MRC 600 about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, MRC 600 would also require other relevant information about the event, e.g. periodicity and duration. This information may be either embedded in the indication or MRC 600 may get it by other means. Most importantly, however, these timing indications need to be such that the MRC 600 can acquire a radio modem's basic periodicity and timing. The timing of the event may either be in the indication itself, or it may be implicitly defined from the indication information by MRC 600.

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handover and (3) as per the policy and configuration settings from MRC 600.

Figure 8:
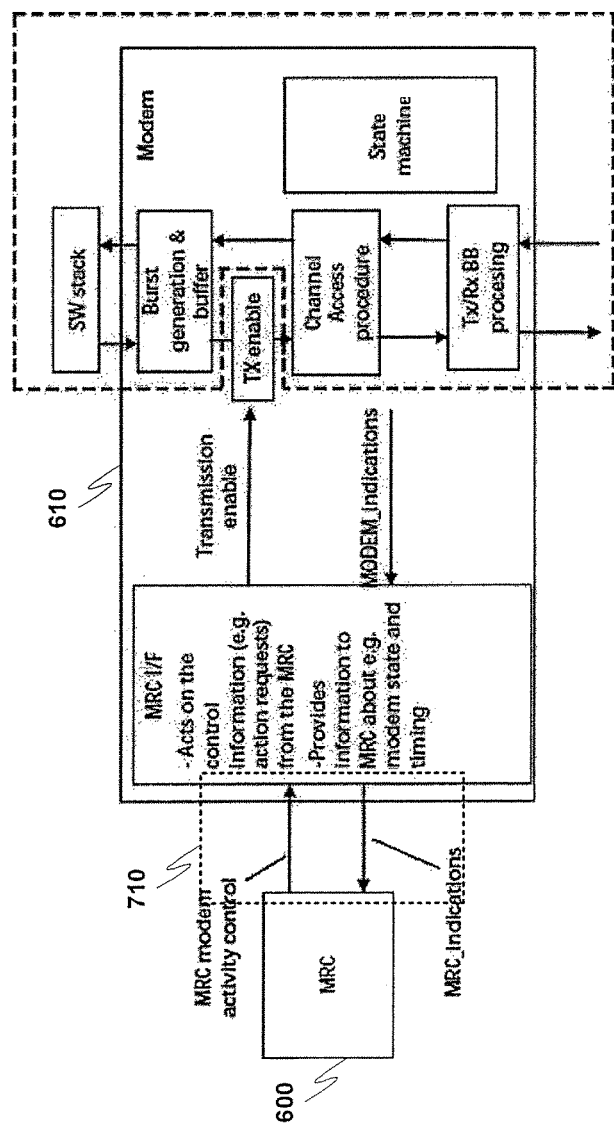
FIG. 8 discloses a more specific example of the functionality described in FIG. 7A-7C.

FIG. 8 discloses a more specific example of the interaction between MRC 600, MCS 700 and a radio modem 610. MRC 600 requires a bi-directional multipoint control interface for each radio under control. In this example, MCS 700 may be used to (1) Get synchronization information from the radio modem 610 to MRC 600, and (2) Provide radio activity control signals from MRC 600 to the radio modem 610 (enable/disable transmission and/or reception). In addition, as previously stated, MCS 700 may be used to communicate radio parameters that are delay sensitive from a controlling point of view between MRC 600 and the radio modem 610. One example of parameters that may be communicated over MCS 700 is the packet type based priority information from MRC 600 to radio modem 610. The packet type based priority information can be used, for example, to allow a WLAN modem to transmit acknowledgement type packets even though the radio activity control signal is not allowing the transmission. This packet type based priority information is typically communicated less frequently than the radio activity control signals. MCS interface 710 can be shared between different radio modems (multipoint) but it cannot be shared with any other functionality that could limit the usage of MCS interface 710 from latency point of view.

MCS 700 is used primarily to communicate the enabled/disabled radio activity periods from MRC 600 to the radio modem 610 and in turn get synchronization indications from the radio modems back to MRC 600. The control signals from MRC 600 that enable/disable a radio modem 610 should be built on a modem's periodic events. MRC 600 gets this information about a radio modem's periodic events from synchronization indications issued by the radio modem 610. This kind of event can be, for example, frame clock event in GSM (4.615 ms), slot clock event in BT (625 us) or any multiple of these. A radio modem 610 may send its synchronization indications when (1) MRC requests it, (2) a radio modem internal time reference is changed (e.g. due to handover or handoff). The latency requirement for the synchronization signal is not critical as long as the delay is constant within a few microseconds. The fixed delays can be taken into account in MRC 600 scheduling logic.

The radio modem activity control may be based on knowledge of when active radio modems 610 are about to transmit (or receive) in the specific connection mode in which the radio modems 610 are currently operating. However, there may also be radio connections which do not adhere to a strict pattern. These connections may be scheduled based on the connection patterns of other radio modems 610 or communication devices in WCD 100. For example, there may be connections with periodicity, but it may also be possible to adjust the start time of an activity pattern to better align with other communication devices. The connection mode of a radio modem 610 is mapped to the time domain operation in MRC 600. As an example, for a GSM speech connection, MRC 600 has knowledge about all traffic patterns of GSM. This means that MRC 600 recognizes that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns that are known a priori by the MRC 600, it only needs to know when the transmission slot occurs in time to gain knowledge of when GSM radio is active. This information may be obtained with the radio synchronization signal. When the active radio modem 610 is about to transmit (or receive) it must check every time whether the modem activity control signal from MRC 600 permits the communication. MRC 600 is always either allowing or disabling the transmission of one full radio transmission block (e.g. GSM slot).

Figure 9:
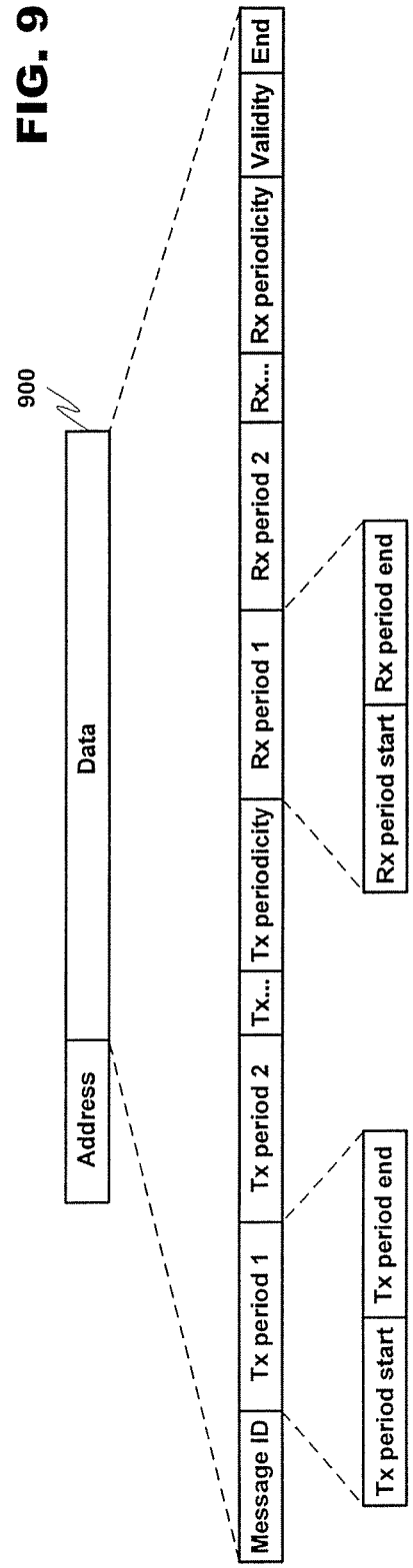
FIG. 9 discloses an exemplary information packet usable with at least one embodiment of the present invention.

An example message packet 900 is disclosed in FIG. 9. Example message packet 900 includes activity pattern information that may be provided by MRC 600 to radio modems 610. The data payload of packet 900 may include at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2...) each containing at least a period start time and a period end time during which radio modem 610 may either be permitted or prevented from executing a communication activity. The ability to include multiple allowed/disallowed periods into a single message packet 900 may support MRC 600 in scheduling radio modem behavior for longer periods of time, which may result in a reduction in message traffic. Further, changes in radio modem 610 activity patterns may be amended using the validity information in each message packet 900.

The modem activity control signal (e.g., packet 900) is transmitted by MRC 600 to a specific radio modem 610. The signal may include activity periods for Tx and Rx separately, and the periodicity of the activity for the radio modem 610. While the native radio modem clock is the controlling time domain (never overwritten), the time reference utilized in synchronizing the activity periods to current radio modem operation may be based one of at least two standards. In a first example, a transmission period may start after a pre-defined amount of synchronization events have occurred in radio modem 610. Alternatively, all timing between radio modem 610 and MRC 600 may be standardized around the system clock for MCS 700. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a time standard, a conversion to modem clock timing must necessarily be implemented whenever a new activity pattern is put into use in radio modem 610.

As stated above, the activity period may be indicated as start and stop times. If there is only one active connection, or if there is no need to schedule the active connections, the modem activity control signal may be set always on allowing the radio modems to operate without restriction. The modem should check whether the transmission or reception is allowed before attempting the actual communication. A resynchronization may be initiated by the radio modem 610 if the transmission is consecutively blocked. The same happens if a radio modem time reference or connection mode changes. A problem may occur if MRC 600 runs out of the modem synchronization and starts to apply modem transmission/reception restrictions at the wrong time. Due to this, modem synchronization signals need to be updated periodically. The more wireless connections that are active, the more accurate MRC synchronization information needs to be.

Figure 10:
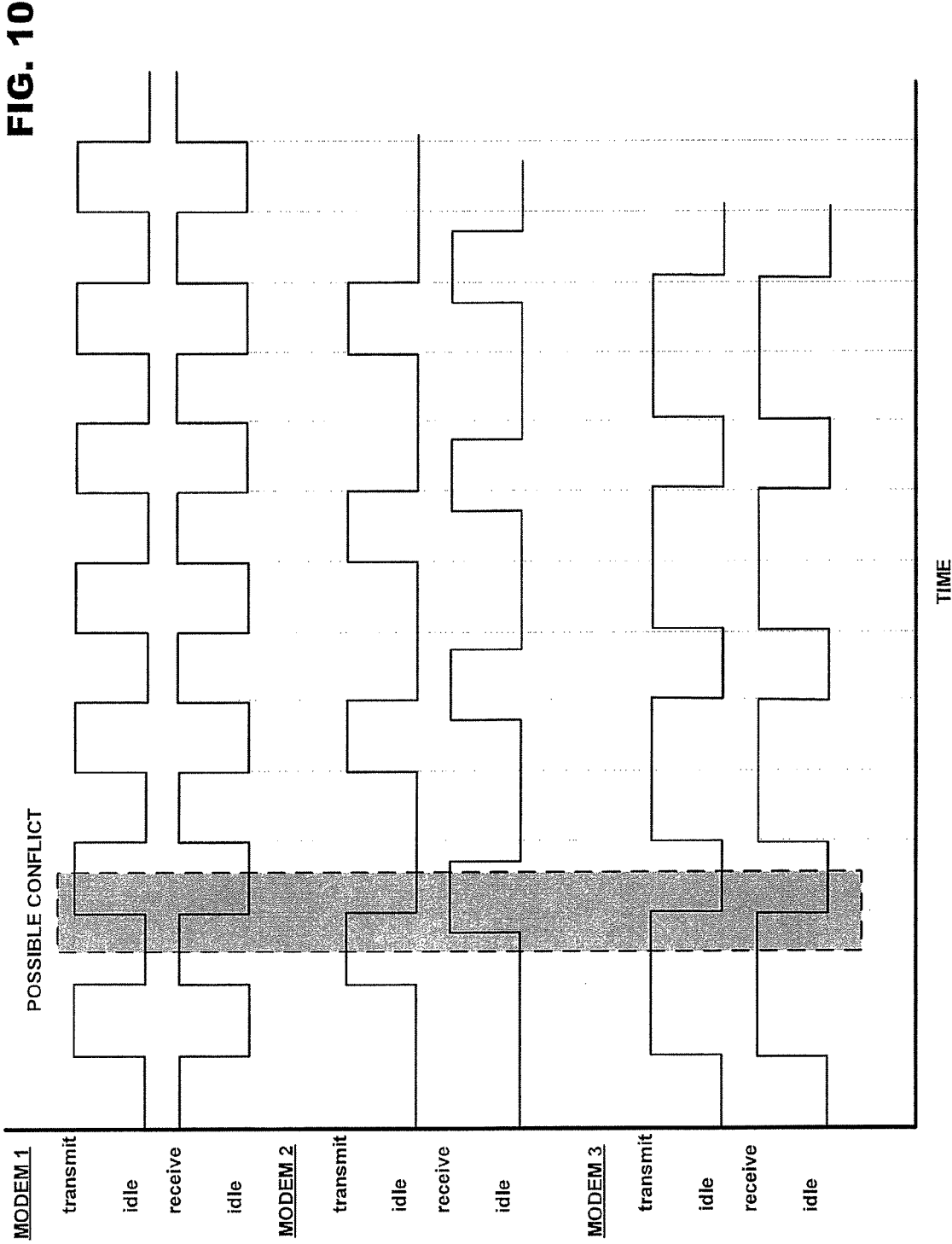
FIG. 10 discloses exemplary timing diagrams for wireless radio modems usable with the present invention.

FIG. 10 discloses a pictorial example of timing patterns between various active radio modems. Modems 1, 2 and 3 all have individual patterns that indicate when a modem is actively transmitting and/or receiving information. One example of a period wherein a possible conflict exists is highlighted in the figure. At this point MRC 600 may act to control various radio modems 610 in order to avoid the conflict. If the activity is to be restricted, MRC 600 configures the modem activity control message so that activity is always denied when radio modem 610 is not allowed to transmit or receive. The restriction can last either the whole period or just an individual transmission/reception instance. In the latter case, the activity can be allowed for some other transactional instance inside the period and radio modem 610 can utilize this to transmit (e.g. to attempt retransmission).

Radio modem 610 can indicate to MRC 600 the radio activity periods that were blocked due to the modem activity control message. This additional communication can be as a safety procedure to ensure that MRC 600 is not continuously blocking the communications due to off synchronization conditions. Radio modem 610 can switch off the transmitter/receiver every time the modem activity control signal is not allowing communication. Because the modem activity control signal is transmitted in advance and it provides information about the allowed and disallowed radio transmission/reception instances in the near future, radio modem 610 can prepare its operations in advance according to the activity control signal. Inside the validity parameter in the activity control message is a field describing whether the new message is replacing or added to the existing activity periods, thus avoiding the need to communicate the full transmission/reception pattern if only minor modifications are needed to correct the operation of the transmitter/receiver.

Figure 11:
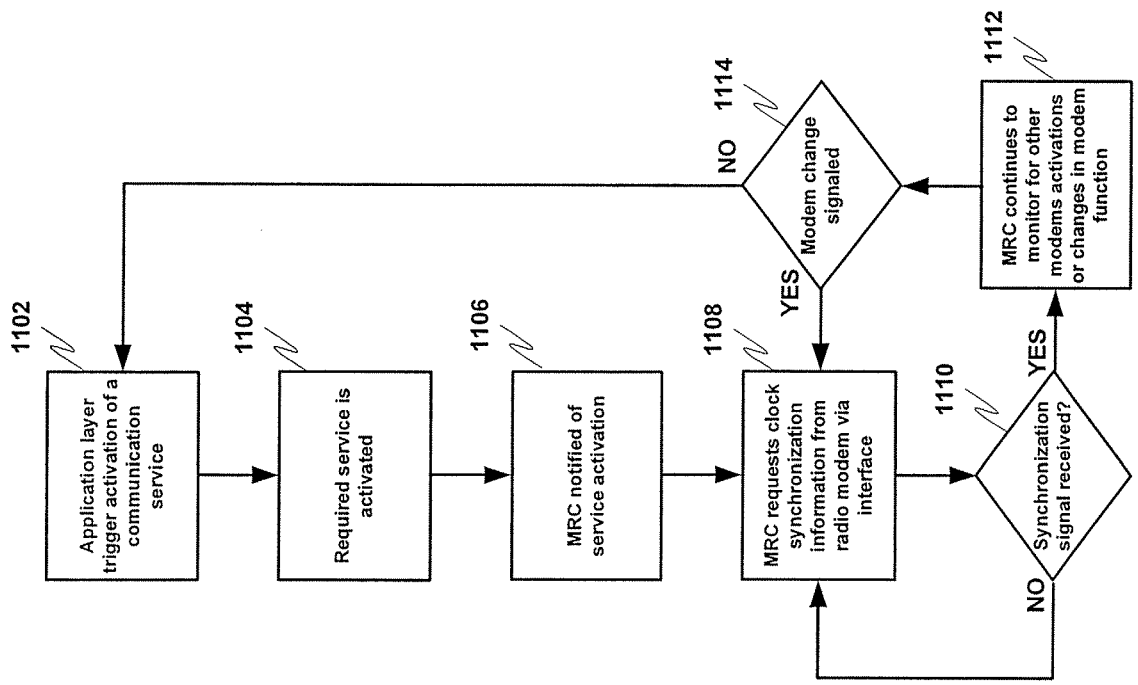
FIG. 11 discloses a flowchart explaining an exemplary process by which a multiradio controller receives information from a plurality of radio modems in accordance with at least one embodiment of the present invention.

A flowchart describing an exemplary process where MRC 600 requests synchronization information from a radio modem in accordance with at least one embodiment of the present invention is disclosed in FIG. 11. In step 1102, the application layer of WCD 100 triggers activation of a communication service. This activation may occur, for instance, due to a manual intervention by user 110 directly activating the communication service, or may instead be triggered indirectly by an application currently being manipulated by user 110. WCD 100 may then activate the service in step 1104. Various subsystems of WCD 100 are notified of the service activation, including MRC 600 (step 1106) which in turn requests clock synchronization information from radio modem 610 via MCS 700 in step 1108. The synchronization request remains active until MRC 600 has received the signal and is synchronized (step 1110). In step 1112, MRC 600 monitors for other radio modem activations, wherein a synchronization signal would need to be requested, or for changes in existing modem behavior. A detected change in radio modem behavior, for example during a handover or handoff, would be detected due to radio modem 610 itself prompting the delivery of synchronization information in step 1114, and so new synchronization information is delivered to MRC 600.

Figure 12:
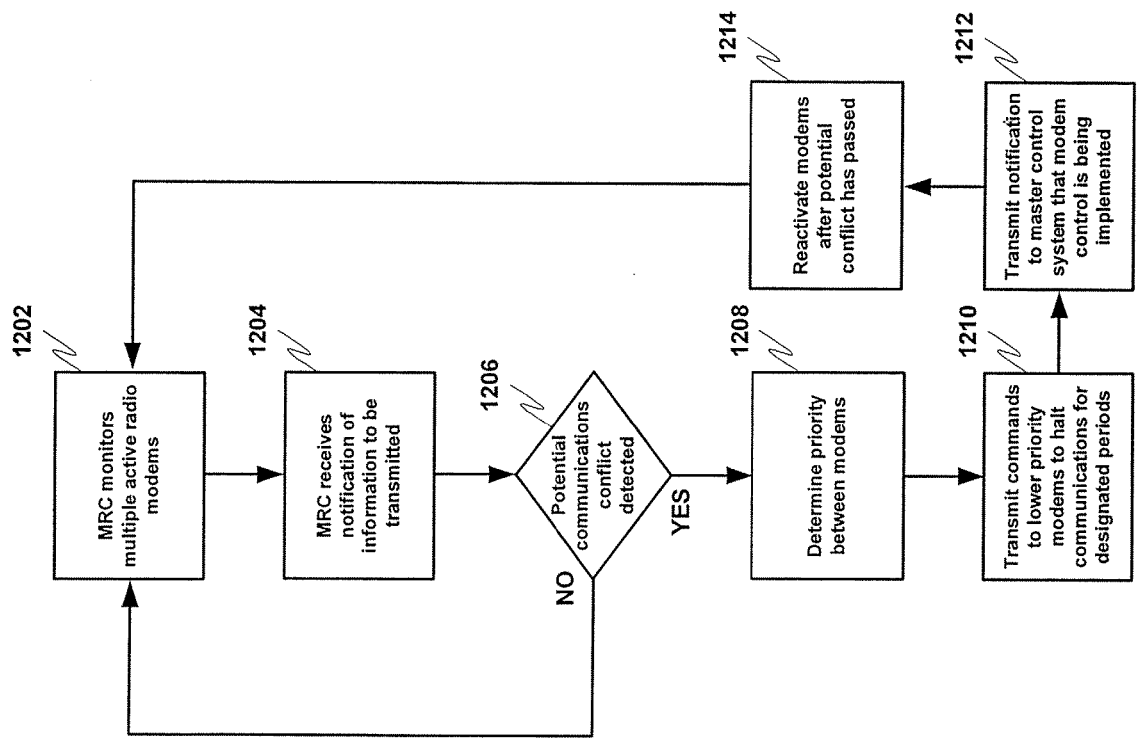
FIG. 12 discloses a flowchart explaining an exemplary process by which a multiradio controller manages a plurality of radio modems when a potential conflict exists in accordance with at least one embodiment of the present invention.

FIG. 12 includes an example of a process wherein MRC 600 monitors active radio modems and implements scheduling in order to avoid conflicts. In step 1202, MRC 600 monitors a plurality of active radio modems. During this monitoring, MRC 700 may further recognize that at least some of the plurality of modems are about to act simultaneously which may result in a potential conflict (steps 1204 and 1206). MRC 600, which has hierarchical information about the various mediums serviced by the radio modems, may then prioritize the radio modems in order to determine which modems to disable (step 1208). In step 1210, MRC 600 transmits disable commands to various modems, essentially pausing the activity of these modems over designated time periods in order to avoid potential conflicts. The optimal timeframe where the decisions of whether radio modem 610 is allowed to transmit or not, needs to be selected to meet the following three criteria: (1) Constant (up to some limits) delay from the control point to the air interface, (2) It must be possible to affect the transmission of individual packets/slots (whatever is the smallest granularity in air interface), (3) Preferably it should be possible to buffer a few transmission packets to a memory in case the transmission is not instantly allowed. The need to buffer packets depends also on the service the radio modem 610 is running. In case of a real time service, the buffering can be time sensitive. Further, any disable information transmitted to radio modems 610 (step 1210) may also be transmitted to the master control system in step 1212 in order to notify of temporary delays due to conflict avoidance, which might otherwise be deemed to be radio modem inoperability. Finally, in step 1214, MRC 600 reactivates all modems once the potential conflict has passed, and resumes monitoring for possible communication conflicts.

VI. Transactional Scheduling in at Least One Radio Modem According to a Multiradio Control.

Multiradio control information may be utilized to control radio scheduling and wireless link adaptation. In at least one embodiment of the present invention, the various messages exchanged between the aforementioned communication components in WCD 100 may be used to dictate behavior on both a local (radio modem level) and global (WCD level) basis. MRC 600 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but it is also performing internal scheduling and link adaptation while taking MRC scheduling information into account.

In order to better understand communication in the present invention, exemplary MRC-radio interface primitives are now described. Primitives carry parameters which are needed in multiradio scheduling.

Air_time_enable (MRC to Radio): MRC 600 may use this command to give radio modem 610 permission to operate for a set time. A regular air-time can be enabled for the radio with an interval parameter. Parameters: start_time, period, interval TX/RX/TRX enabled. (See, for example, the previously described communication packet disclosed in FIG. 9)

SYNC_ind (Radio to MRC): Radio modem 610 indicates time dependent issues (e.g. start time of the activity). This primitive may be sent to MRC 600 to indicate when an activity starts if the radio is enabled to use air_time, or when the activity would have started if the radio is currently disabled because of the air_time_enable primitive. MRC 600 uses this indication as a help when composing air_time_enable messages for radio modem 610.

Information_req (MRC to Radio): MRC 600 may use this command to request information that is specified in the parameters of the primitive from radio modem 610.

Information_cnf (Radio to MRC): Radio modem 610 may inform MRC 600 that it has received the Information_req message. Using success and failure parameters, radio modem 610 can indicate whether it can provide the requested information to MRC 600.

Information_ind (Radio to MRC): Radio modem 610 may provide requested information parameters to the MRC 600. One request may result in multiple indications, for example, indications which are sent regularly. These indications may also be send without a request from MRC 600 (e.g., if remote device wants to change some parameters in a link).

Configuration_change_req (MRC to Radio): MRC 600 may use this primitive to indicate to radio modem 610 that a parameter change is required.

Configuration_change_cnf (Radio to MRC): Radio modem 610 may then indicate to MRC 600 that the required configuration change has succeeded or failed.

In at least one embodiment of the present invention, the use of Air_time_enable and its parameters in the radio internal scheduling is especially considered. However, radio modem 610 may also use some other parameters in scheduling (e.g., allowed frequencies), which may be included in a Configuration_change_req message. Allowed frequencies information would be important to radio modem 610 if it were implementing a frequency hopping spread spectrum strategy. If MRC 600 does not allow radio modem 610 to utilize all the frequencies, the modem can take this into account in the scheduling. Even if radio modem 610 is enabled to transmit according to an Air_time_enable message, it may still not transmit if the frequency hopping algorithm lands on a previously disabled frequency at the time the transmission would have occurred. Depending on timing requirements (delay sensitive vs. delay tolerant), the primitives can be either exchanged via MCS 700, or they can be obtained via the protocol stack of WCD 100.

Figure 13A:
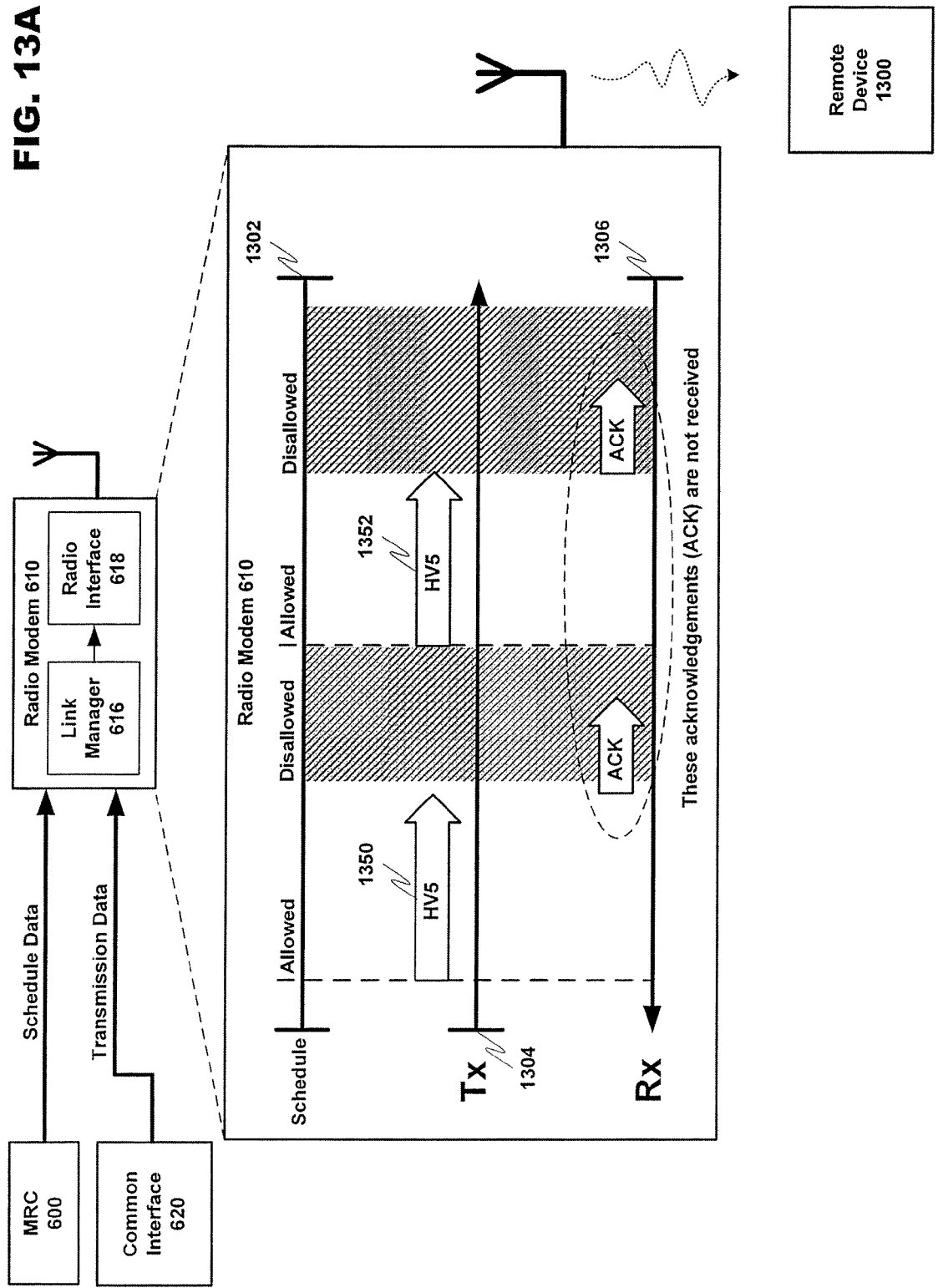
FIG. 13A discloses a problem situation regarding communications conflicts in a radio modem in accordance with at least one embodiment of the present invention.

Referring now to FIG. 13A, a communication example is disclosed wherein radio modem 610 receives scheduling information from MRC 600, and follows this scheduling information "blindly" without any other considerations. Radio modem 610 may receive scheduling information and transmission data from MRC 600 (e.g., via MCS 700) and common interface 620, respectively. Radio modem 610 includes at least a link manager 616 for controlling the basic functions of radio interface 618. Radio interface 618 wirelessly connects radio modem 610 to other devices such as remote device 1300.

Radio modem 610 is further shown as a process diagram including a schedule timeline 1302, a transmission (Tx) timeline 1304 and a receiving (Rx) timeline 1306. In the present example, MRC 600 has delivered a transmission schedule for radio modem 610. This transmission schedule includes either allowed periods (whose starting point is designated by a dotted line) or disallowed periods (indicated by a crosshatched area). During an allowed period, radio modem 610 may transmit data packets to, and/or receive data packets from, remote device 1300. In a disallowed period, all communications for radio modem 610 may be disabled.

Problems may begin to occur in FIG. 13A when a radio modem 610 receives information from common interface 620 in the form of transmission data. An information packet is formed, in this example a Bluetooth™ HV5 packet, for immediate transmission. Radio modem 610 may then check schedule 1302 to determine whether communication is permitted. At the point where the HV5 packet is formed, the schedule 1302 is permitting transmission. Therefore, radio modem 610 initiates communications and sends the HV5 packet to remote device 1300 (shown as an outgoing packet 1350 on Tx timeline 1304). However, in this example radio modem 610 is not looking ahead in schedule 1302 to determine when the allowed period will end. The modem is simply checking the current allowed/disallowed status of schedule 1302 when it begins to send the information provided by common interface 620. A problem may occur because the allowed period ends before an acknowledgement (ACK) is received by radio modem 610 from remote device 1300. Since all communications may be halted during a disallowed period, the ACK is not received and radio modem 610 believes that the HV5 packet was lost or corrupted in transmission. Therefore, radio modem 610 will attempt to retransmit the HV5 packet during the next allowed period. The second packet transmission 1352 is also successfully sent to remote device 1300, but the ACK is again lost due to a disallowed period commencing before the ACK packet is received. In this manner, radio modem 610 is forced to retransmit the same information repeatedly even though the information was actually received at remote device 1300. This needless retransmission may be detrimental to communication performance due to radio modem 610 using limited bandwidth to resend old information.

Figure 13B:
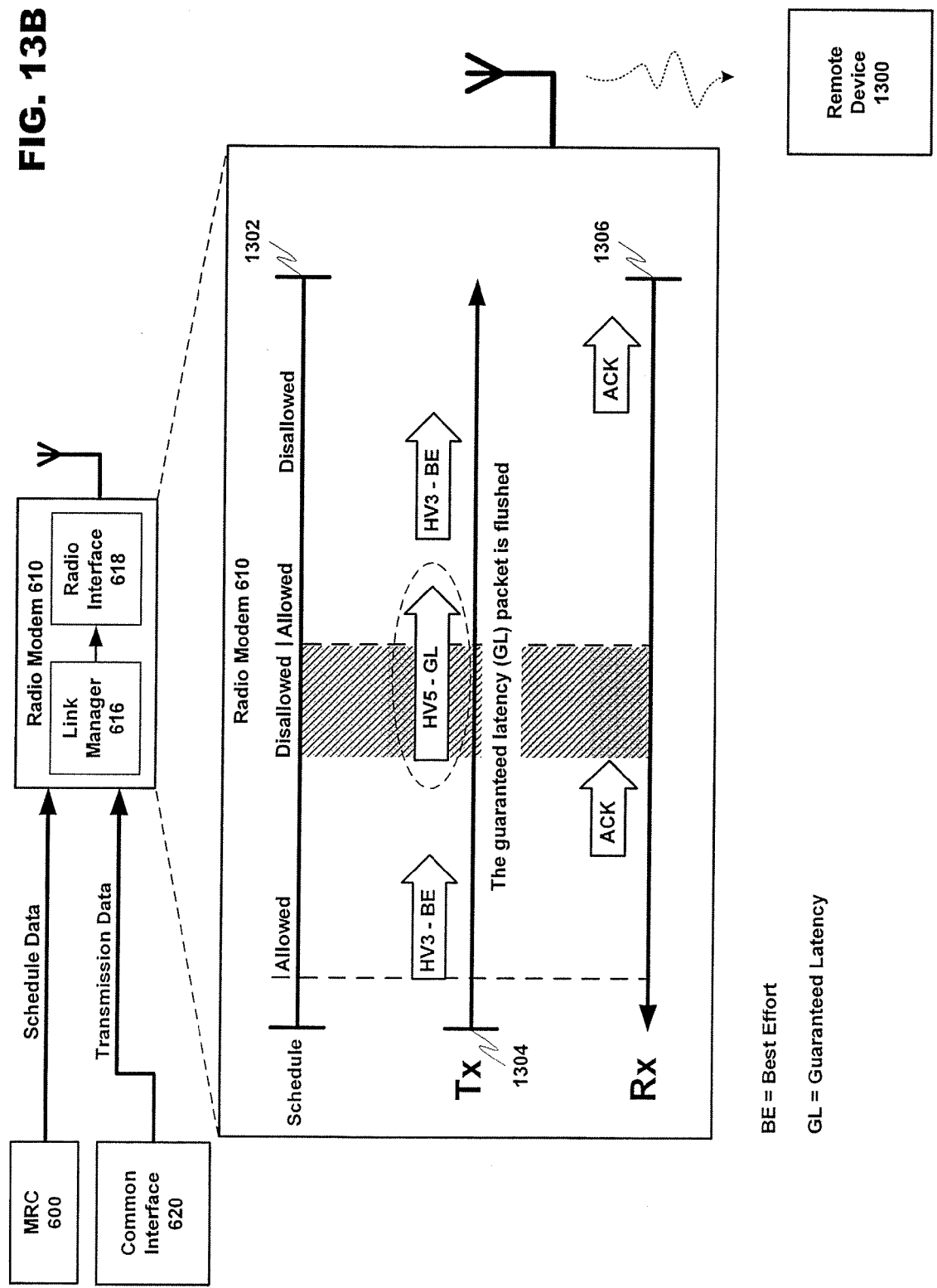
FIG. 13B discloses another problem situation regarding communications conflicts in a radio modem in accordance with at least one embodiment of the present invention.

Another possible problem becomes apparent when radio modem 610 sends data packets indiscriminant of the type of data being sent. FIG. 13B presents a example scenario where an allowed period in schedule 1302 is utilized to send data packets to remote device 1300. There may be different types of data packets that have been requested for delivery to the remote device. These packets may at least be different sizes or types (HV3 vs. HV5) and different priorities (best effort vs. guaranteed latency). Best effort data (BE) packets may be sent as soon as possible by radio modem 610. On the other hand, guaranteed latency (GL) packets require a delivery in a certain period or they expire (If not delivered, these packets are "flushed"). In the first allowed period, a HV3-BE packet is sent first before an HV5-GL packet. The HV3-BE packet is successfully received by remote device and acknowledged. The transmission of the HV5-GL packet is not completed before the allowed period concludes. Since this is a GL packet that must be delivered in the current period, the packet is flushed because the period is ended and the data is lost. This problem could have been avoided if the HV5-GL packet was transmitted first, but radio modem 610 was not looking ahead to determine when the period would end, and as a result, the packets were transmitted in a non-prioritized order (e.g., in which they were received).

Figure 14A:
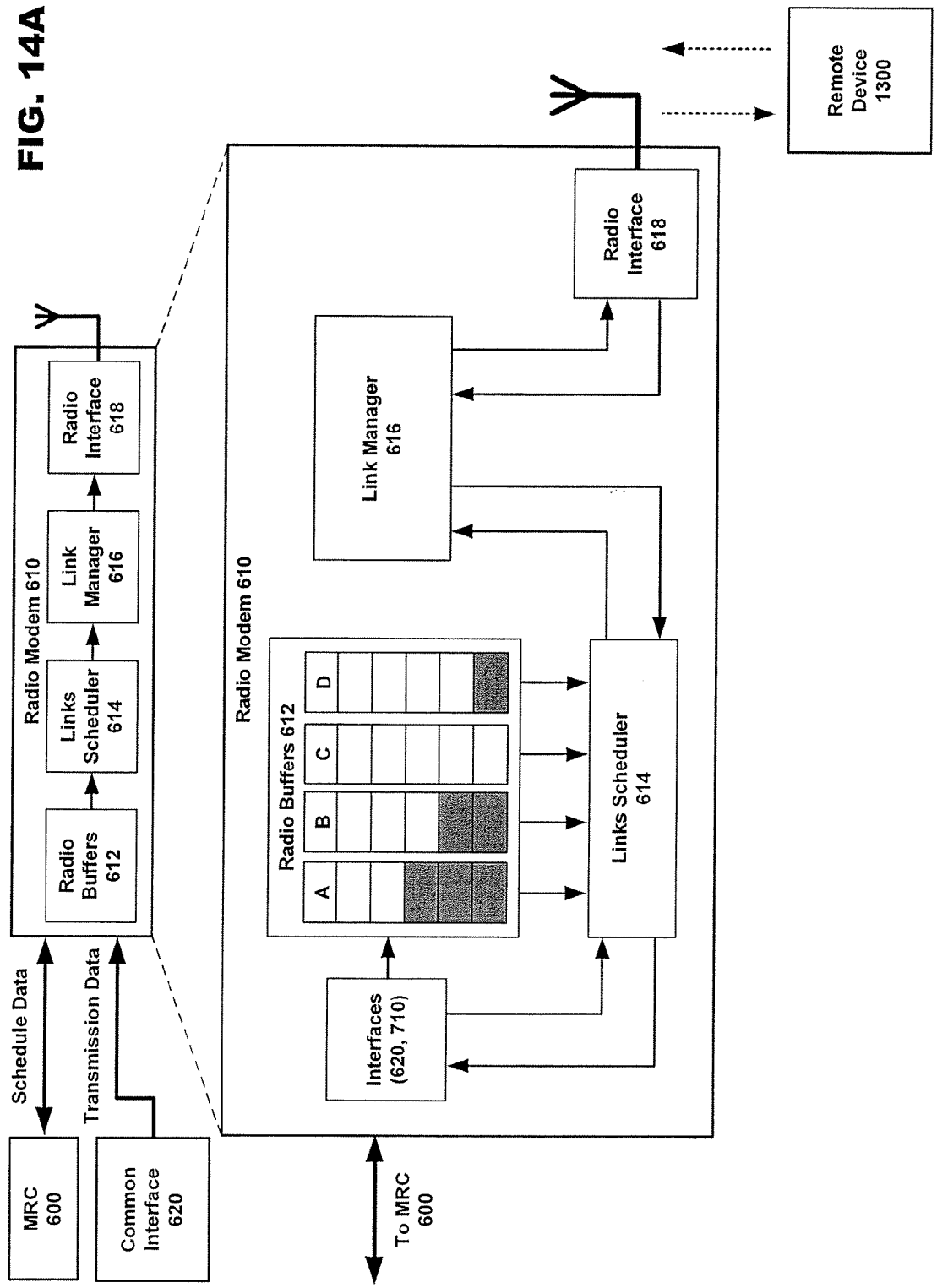
FIG. 14A discloses a structural diagram of radio modem control and communication elements in accordance with at least one embodiment of the present invention.

FIG. 14A discloses an implementation of at least one embodiment of the present invention. MRC 600 and common interface 620 provide information to radio modem 610 including additional components such as radio buffers 612 and links scheduler 614. Links scheduler 614 may be coupled to interfaces 620 and 710 for communicating with devices such as MRC 600. Links scheduler 614 may also be coupled to radio buffers 612 and link manager 616 for conveying information from the buffers out to radio interface 618.

Radio buffers 620 may receive information from, for example, common interface 620. This information may be separated into different holding areas (represented as areas A, B. C and D in the figure) depending on the requirements of the data. The information may be separated by BE and GL classifications, packet size, data type or any other relevant category. Links scheduler 614 may select from among the message information stored in radio buffers 620 in order to determine the most appropriate data to prioritize and queue for transmission.

Link manager 616 and radio interface 618 are responsible for transmitting data packets in an order determined by links scheduler 614. In at least one embodiment of the present invention, link manager 616 may transmit information back to links scheduler 614. This information may sent from remote device 1300 in response to an inquiry regarding the transmission schedule determined by MRC 600. In some instances it may be impossible for remote device 1300 to receive information in accordance with the activity schedule defined for radio modem 610. Remote device 1300 may then advise link manager 616 (through radio interface 618) that the schedule is incompatible, and as a result, must be changed. In at least one scenario, remote device 1300 may be informed about predicted "absences" of radio modem 610, to which it responds that the "absence mask" is unacceptable. Alternatively, link manager 616 may determine that the schedule is incompatible with remote device 1300 if no response is given by remote device 1300 to transmitted messages, or if remote device 1300 attempts to poll only at times radio modem 610 cannot operate. However, link manager 616 may only be aware of polls at the wrong time if radio modem 610 is enabled to receive at those times but not transmit. This information may be transferred back to MRC 600 in a request as will be further described below.

Figure 14B:
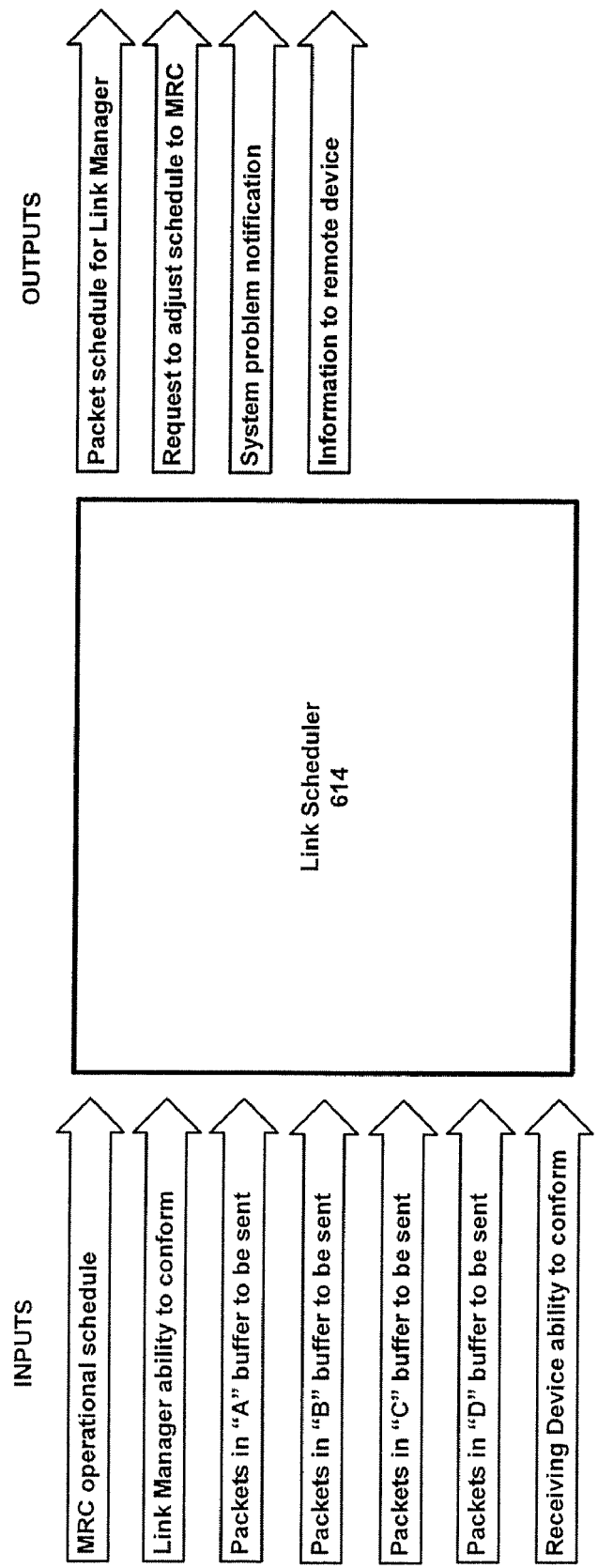
FIG. 14B discloses an input/output diagram of a radio modem control element in accordance with at least one embodiment of the present invention.

FIG. 14B discloses various inputs and outputs associated with links scheduler 614. In at least one example, links scheduler 614 may consider any or all of the listed inputs when determining an appropriate functional activity schedule for radio modem 610. Inputs such as the activity schedule determined by MRC 600, the ability of link manager 616 to control radio modem 610 to conform to the MRC schedule, the various types of data packets waiting to be sent in radio buffers 612, the ability of remote device 1300 to conform to the MRC schedule, etc. may all be considered by link scheduler 614 in prioritizing the behavior of radio modem 610. Links scheduler 614 may then respond to this input using at least the listed outputs also shown in FIG. 14B. If the combined inputs demonstrate that the schedule set forth by MRC 610 is acceptable, then links scheduler 614 may begin to pass data packets to link manager 616 in an priority order appropriate for the activity schedule defined by MRC 600. However, if the schedule is not acceptable, then links scheduler 614 may utilize the previously described primitive commands to interact with MRC 610 in order to request a scheduling change. An example case when radio modem 610 may not be able to use the schedule, even if interval and window is sufficient, is where the start times of the windows are at the wrong places. If the radio has a synchronous link, radio modem 610 has to try to reschedule the start times of transmissions with remote device 1300. Remote device 1300 may not accept, and then the radio should request MRC 600 to change the schedule. Upon request MRC 600 may try to reschedule other radio modems 610 in the terminal, or terminate some applications. This may result in MRC 600 using information_req messages to inquire as to the status of other radio modem 610 and whether they are able their schedules in order to accommodate the disabled radio modem. Alternatively, MRC 600 may request a schedule change if other modems are experiencing problems. Links scheduler 614 may utilize some or all of the input information listed in FIG. 14B to respond as to whether radio modem 610 can accommodate the requested schedule change. Links scheduler 614 also may issue general problem notifications to inform MRC 600 or master control system 640 of problems with modem 610. These problems may include transmission/reception errors in modem 610, the inability to establish or maintain a wireless connection with remote device 1300, buffer overruns due to the need to constantly retransmit data packets, or other related problems.

In at least one embodiment of the present invention, radio modem 610 may have the ability to communicate the MRC schedule 1302 to remote device 1300. The remote device may use this information to determine whether the remote device can comply with the proposed allowed/disallowed schedule. Further, remote device 1300 may use the schedule to alter its own behavior. For example, remote device 1300 may choose to enter a low power mode when it knows that MRC 600 will not be transmitting. This may allow the device to conserve power during periods when it knows not to expect an incoming transmission. Communication mediums such as Bluetooth™, WLAN, etc. may use features like an absence mask or power save mode to signal to remote device 1300 the times when it is absent from the link. This would allow the remote radio to use its time more efficiently, because it does not try to transmit when the radio cannot receive.

Figure 14C:
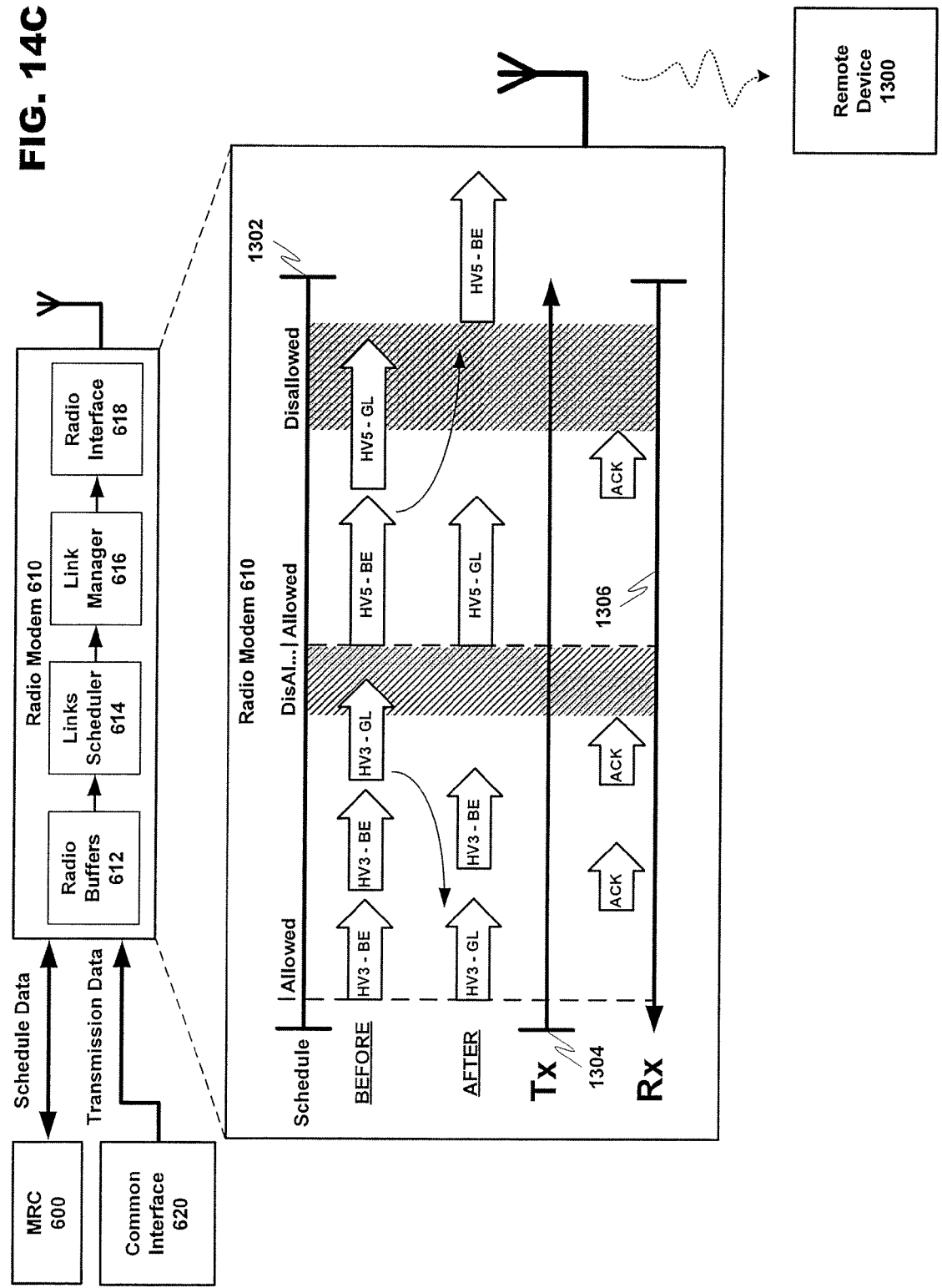
FIG. 14C discloses an exemplary communication packet processing diagram of radio modem in accordance with at least one embodiment of the present invention.

A process flow diagram similar to FIGS. 13A and B is shown in FIG. 14C. In this example, a "BEFORE" and "AFTER" representation of packet transmission is disclosed. The before representation corresponds to the situations in FIGS. 13A and B, wherein only a limited intelligence may be included in radio modem 610. The after situation expresses an example of the functioning of a system such as in FIGS. 14A and B. In the before example, two HV3-BE packets are queued for transmission before an HV3-GL packet in the first allowable period. This would result, as shown, in the HV3-GL packet being flushed before it is successfully transmitted to remote device 1300. Further, in the second period an HV5-BE packet is being sent before an HV5-GL packet, causing the same bad result wherein the guaranteed latency packet is flushed.

The after scenario includes changes to the packet order due to any or all of the various inputs which may be considered by links scheduler 614. The HV3-GL may be pulled from radio buffers 612 before any BE type packets are sent, therefore ensuring that the guaranteed latency information is sent in the current period. An HV3-BE packet is then scheduled after the GL packet, and the second BE packet is cancelled or held until the next available allowed period. Further, in the second allowed period, the HV5-BE packet is delayed until after the disallowed period, allowing the HV5-GL packet to be sent first. In this way, the information that must necessarily be sent in a period is handled before non-critical information.

VII. General Wireless Networking Operations.

According to various embodiments of the present invention, there are provided systems and methods applicable, for instance, in wireless networking (e.g., WLAN (Wireless Local Area Network)) functionality.

One or more time periods for one or more radio modalities (e.g., IEEE 802.11 WLAN) of a WCD having multiple radio modalities might, in various embodiments, be assigned. A radio modality might, in various embodiments, correspond to a modem and/or other wireless communication hardware, and/or to a form of wireless communication in which a WCD is capable of participating.

In various embodiments, with respect to uplink, instruction might be provided that operations corresponding to a particular radio modality (e.g., IEEE 802.11 WLAN) commence at a time prior to the start of such a time period. The instruction might, in various embodiments, be dispatched at the time and/or specify the time. Channel contention might, in various embodiments, be performed prior to the time period, and/or data uplink might be performed within the time period.

Moreover, in various embodiments with respect to uplink instruction might be provided that operations corresponding to the particular radio modality terminate at a time prior to the end of the time period. The instruction might, in various embodiments, be dispatched at the time and/or specify the time. No data uplink might, in various embodiments, be performed subsequent to the time period.

In various embodiments, with respect to downlink, instruction might be provided that operations corresponding to a particular radio modality (e.g., IEEE 802.11 WLAN) commence at a time prior to the start of such a time period. The instruction might, in various embodiments, be dispatched at the time and/or specify the time. Channel contention might, in various embodiments, be performed prior to the time period, one or more uplink operations triggering downlink might be performed within the time period, and/or data downlink might be performed within the time period.

Various aspects will now be discussed in greater detail.

VIII. Wireless Networking Uplink Operations.

According to various embodiments of the present invention, the MRC may make use, for instance, of knowledge about uplink (UL) channel delays. The MRC might, for example, acquire information about how long (e.g., on average and/or typically) it takes for a wireless networking (e.g., WLAN) radio modem (e.g., of a WCD) to gain channel access. Such data might, in various embodiments, be needed for each access category (AC), or for each AC presently in use by the WCD. It is noted that, in various embodiments, such information might be acquired from the radio modem. It is further noted that, in various embodiments, should the radio modem be operating in legacy mode (e.g., no Quality of Service (QoS) support and/or no support for ACs), similar information might be employed.

Such information might, for instance, be employed by the MRC to estimate how long it takes for the WCD to start transmission after invoking a channel access procedure. The MRC might, in various embodiments, determine one or more probabilities corresponding to such estimates.

In various embodiments, it might be considered desirable that actual UL transmission start as close to possible to the termination of operation of other radio modalities of the WCD (e.g., radio modalities that might tend to interfere with the UL transmission). It might, for instance, be taken to be the case that, should instruction that operation commence (e.g., a transmission schedule timing signal) be dispatched (e.g., from the MRC to the modem) such that channel contention occurs upon termination of operation of other radio modalities of the MRC, a certain portion of an assigned time period (e.g., assigned by the MRC) for uplink might be lost to channel contention. Accordingly, in various embodiments one or more operations might be performed to attempt to make uplink transmission start time as close as possible to the assigned time period. Operations might, for instance, be performed such that contention takes place while other radio modalities of the WCD are still operating.

The channel contention might, for instance, correspond to functionality wherein multiple WCDs compete for usage of a channel (e.g., a WLAN channel), with a WCD that prevails in the contention being allowed to use the channel for a maximum amount of time corresponding to a transmission opportunity (TXOP) limit. Channel contention might, for example, be repeated with termination of data transmission and/or expiration of the amount of time.

Time period assignment (e.g., by the MRC) might, for instance, be performed with respect to various radio modalities of a WCD. Assignment might, for example, take into account communication priority information and/or related information. To illustrate by way of example, in the case where radio modalities of a WCD included Bluetooth™, WLAN, and UWB, a first time period might be assigned to Bluetooth™, a second time period might be assigned to WLAN, a third time period might be assigned to Bluetooth™, a fourth time period might be assigned to WLAN, a fifth time period might be assigned to Bluetooth™, a sixth time period might be assigned to UWB, a seventh time period might be assigned to Bluetooth™, and an eighth time period might be assigned to WLAN. It is noted that, in various embodiments, the radio modalities of a WCD having multiple radio modalities might not share physical parts. For instances, the radio modalities might not share antennas or modems.

One or more operations might, for example, be performed to address the above-discussed loss due to channel contention. For instance, there might be calculation of how far in advance operation is to commence (e.g., with an instruction being dispatched at a time at which operation is to commence and/or specifying that time). Calculation (e.g., by the MRC) of one or more extents of such advance might, for instance, take into account a number of factors.

For example, one or more uplink access delays might be taken into consideration. Such uplink access delays might, for instance, be with respect to one or more ACs, and/or one or more access delay histograms might be considered. As another example, one or more Enhanced Distributed Coordination Function Channel Access parameters (EDCA) parameters might be taken into consideration. Such parameters might, for instance, be with respect to one or more ACs, and/or might include one or more TXOP limits. As yet another example, one or more service priorities and/or service parameters might be taken into consideration. As further examples, channel load, packet sizes, and/or data rate might be taken into consideration. It is noted that, in various embodiments, length in time of transmitted packets might be controlled (e.g., by the MRC).

In various embodiments, there might be calculation of how far in advance operation is to terminate (e.g., with an instruction being dispatched at a time at which operation is to terminate and/or specifying that time). Calculation of such advance might, for instance, be performed as discussed above. The instruction that operation terminate might, for instance, constitute indication of the last moment for the radio modem to start contention for a transmission. The MRC might, for instance, act to ensure (e.g., with some probability) that UL-related operations end before start of operation of other radio modalities of the WCD (e.g., radio modalities that might tend to interfere). For instance, the MRC might act such that the radio modem does not start contention followed by a frame exchange at and/or just before other radio modalities start their operation.

Figure 15:
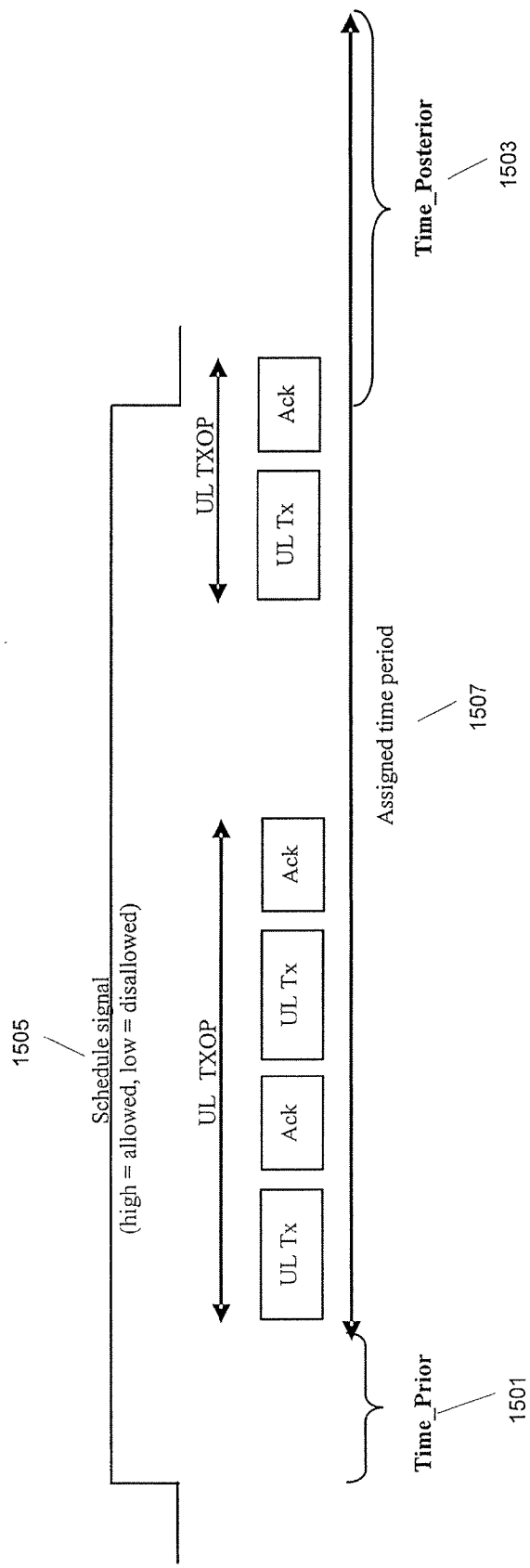
FIG. 15 discloses exemplary aspects of uplink operations in accordance with at least one embodiment of the present invention.

Depicted in FIG. 15 are various exemplary aspects of UL operations according to various embodiments of the present invention. Time_Prior 1501 and/or Time_Posterior 1503 might, for instance, be calculated (e.g., by the MRC) as discussed above with respect to calculation of extent of advance.

Time_Posterior 1503 might, for instance, be viewed as indicating the amount of time by which schedule signal 1505 is brought low before the assigned time period 1507 has elapsed. Time_Posterior 1503 might, for instance, be calculated (e.g., by the MRC) based on an estimation of required channel contention time and/or the UL TXOP. One or more safety factors (e.g., to ensure successful data exchange) might, in various embodiments, be taken into account in calculating Time_Posterior 1503.

Time_Prior 1501 might, in various embodiments, be chosen such that as much as possible of the channel contention performed occurs before (e.g., just before) an assigned time period) without unnecessarily risking the start of uplink communication.

Time_Prior 1501 might, for instance, serve to define how far in advance the modem is allowed to commence operation. The modem might, for example, be allowed to commence channel access immediately in response to instruction that operation commence. For instance, the modem might be allowed to commence channel access in response to schedule signal 1505 going high. It is noted that although, so as to illustrate by way of example, schedule signal 1505 is indicated as dictating that operation commence when high (e.g., "high=allowed") and that operation terminate when low (e.g., "low=disallowed"), the meaning of high and low might, in various embodiments, be flipped. It is noted that, in various embodiments, it might be considered to be ideal that actual transmission start immediately after Time_Prior 1501. Time_Posterior might, for instance, dictate the lasts point for the modem to start channel access.

With respect to that which is discussed above regarding calculation of extent of time advance, it is noted that Time_Prior 1501 might, for example, be calculated in a manner taking into account factors including access delays and/or service parameters. Access delays might, for example, be measured (e.g., regularly). Such measurement might, for instance, be performed by the radio modem. As another example, load information and/or information about delays with different loads might be taken into account. Such information might, for instance, be pre-stored. The load information might, for example, be proportional (e.g., directly proportional) to the average access delay that one or more WCDs are facing. It is noted that, in various embodiments, the probability of access for a packet having a certain duration might be optimized (e.g., statistically) based on access probability versus access delay. Shown in FIG. 16 is an exemplary access delay distribution according to various embodiments of the present invention.

Figure 16:
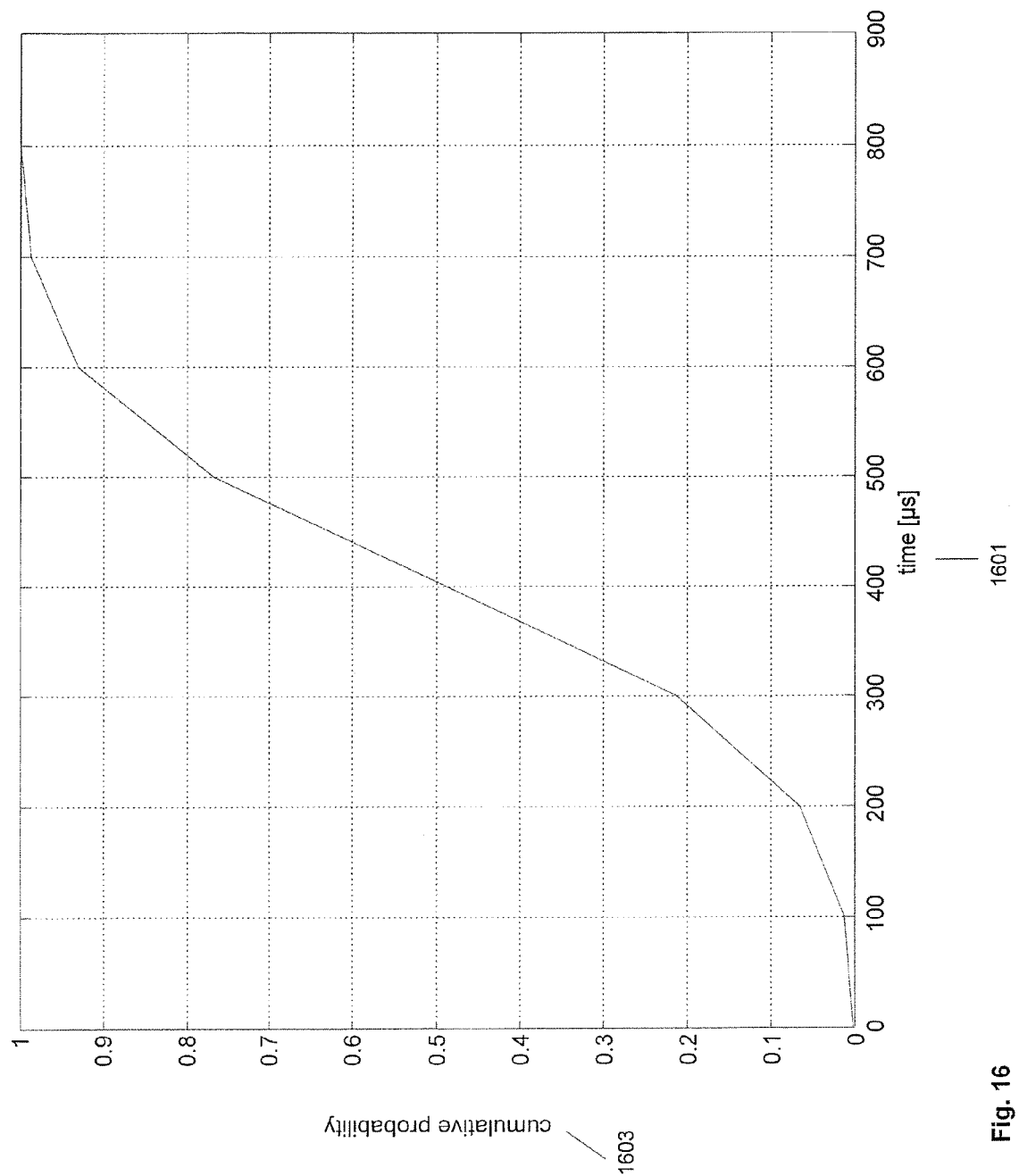
FIG. 16 discloses an exemplary access delay distribution in accordance with at least one embodiment of the present invention.

Shown, for instance, in FIG. 16 is one exemplary channel access delay 1601 versus cumulative access probability 1603 distribution for one exemplary load condition. One or more operations might, for example, be performed (e.g., by the MRC) to select (e.g., based on the used application) the packet access probability that is to be guaranteed. Such consideration of used application might, for instance, take into account one or more service parameters. It is noted that, in various embodiments, each load condition might have a different channel access delay probability curve.

As an illustrative example with respect to FIG. 16, in the case where a real time application is being employed where the number of lost packets was desired to be low, 99% probability might be chosen. As the delay distribution of FIG. 16 indicates a time of 750 µs for a 99% cumulative probability, it might be determined (e.g., by the MRC) that that the channel contention procedure will last 750 µs on average.

As another illustrative example with respect to FIG. 16, suppose a case where a non-real time application is being employed where an acceptable QoS can be guaranteed when 70% probability is chosen. As the delay distribution of FIG. 16 indicates a time of 480 µs for a 70% cumulative probability, it might be determined (e.g., by the MRC) that the channel contention procedure will last 480 µs on average.

In various embodiments, via, for instance, an access delay distribution, taken into account (e.g., by the MRC) might be one or more typical channel access delays (e.g., based on load), and calculated (e.g., by the MRC) might be the probability that transmission will start at a certain time taking into account a used application. Such functionality might, for example, result in a Time_Prior value.

With respect to that which is discussed above, Time_Posterior might, for instance, be calculated (e.g., by the MRC) based on knowledge about access delay and the duration of individual transmissions. Transmission and/or TXOP durations might, for instance, be calculated based on service type (e.g., with one or more service types defining one or more TXOP limits), data rate, and/or packet size. It is noted that, in various embodiments, the ultimate time limit for transmission might be considered to be the TXOP limit, but typical transmissions might be shorter than the time give by the TXOP limit.

With reference to the discussed MRC functionality it is noted that the MRC might, in various embodiments, be implemented via one or more software modules (e.g., running on a WCD). It is further noted that, in various embodiments, the MRC might be implemented in hardware (e.g., via one or more integrated circuits). For instance, in various embodiments various MRC functionality discussed herein might be performed by specialized hardware, and/or otherwise not by one or more general purpose processors. One or more chips and/or chipsets might, in various embodiments, be employed. In various embodiments, one or more ASICs might be employed.

IX. Wireless Networking Downlink Operations.

Downlink (DL) operations might, in various embodiments, be scheduled in a manner employing power save (PS) modes and/or uplink scheduling. When a WCD is operating in asynchronous PS mode an access point (AP) might, for instance, buffer DL frames directed to the WCD that is in a sleep state. Upon waking the WCD might, for instance, transmit a trigger frame indicating to the AP that the WCD is awake and that a frame (e.g., PS poll scheme) and/or a sequence of frames (e.g., service period scheme) can be transmitted.

According to various embodiments of the present invention, performed might be a UL operation wherein such a trigger frame is transmitted by the WCD. The trigger frame might, for instance, serve to launch downlink communication operation where the AP transmits the buffered information to the WCD as per the scheme. The UL operation wherein the trigger frame is transmitted might, for instance, be scheduled (e.g., by the MRC) in a manner analogous to that discussed above. The trigger frame might, for example, be sent in the beginning of an assigned time period (e.g., an assigned time period of the sort discussed above).

It is noted that, in various embodiments, the first UL packet that tells the AP that the WCD is awake and triggers a process in the AP that might be considered to be made up of three phases: frames from sleep buffer to transmit buffer (e.g., DL_time_1), DL access delay (e.g., DL_time_2), and DL operation (e.g., DL_time_3). DL_time_1 might, for instance, represent the amount of time required for the AP to move buffered data from general memory to transmit buffer memory. DL_time_2 might, for instance, represent the amount of time required for the AP to perform channel contention and start transmission.

It is further noted that, in various embodiments, in the PS poll scheme DL operation might be the last phase after which the WCD switches back to a sleep state. It is additionally noted that, in various embodiments, in the service period scheme phases 2 and 3 might be repeated several times after each other (e.g., Phase_1, Phase_2, Phase_3, Phase_2, Phase_3, Phase_2, Phase_3, etc.). It might, in various embodiments, be up to the access point to decide how many such repetitions take place before the WCD is allowed to enter the sleep state. The AP might, for instance, indicate such with a specific dedicated bit in a DL_frame header (e.g., a send of service period (EOSP) bit). Such a bit might, for example, be so dedicated such that only that bit sets the WCD to sleep.

Figure 17:
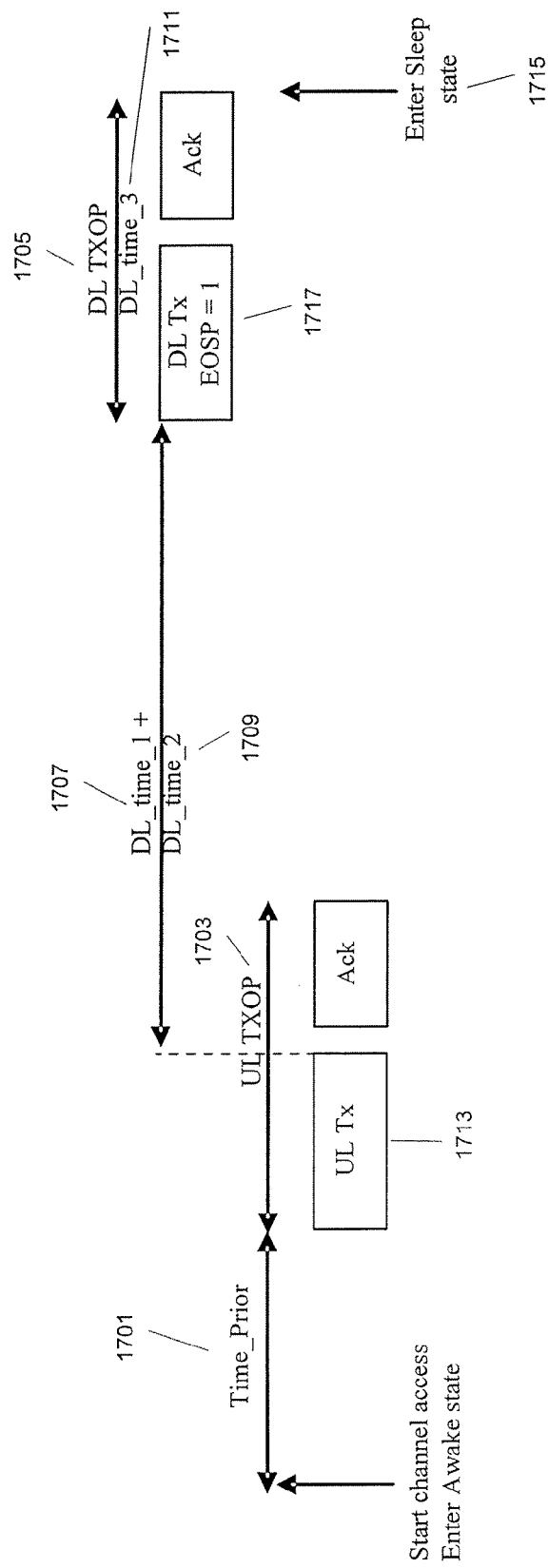
FIG. 17 discloses exemplary aspects of downlink operations in accordance with at least one embodiment of the present invention.

With reference to that which is discussed above, it is noted that scheduling of DL operations might, for instance, involve scheduling (e.g., by the MRC) of a UL operation (e.g., including the trigger frame) wherein, for instance, the above-discussed process is activated in the AP. Shown in FIG. 17 are exemplary aspects of DL operations according to various embodiments of the present invention. With respect to FIG. 17 it is noted that the assigned time period might, in various embodiments, start at or near the end of Time_Prior 1701 and end at or near "Enter sleep state" 1715. Moreover, in various embodiments FIG. 17 might correspond to one or more real time services (e.g., Voice over Internet Protocol (VoIP)), a circumstance where the AP does not have a large amount of data buffered, and/or a circumstance where legacy PS poll allows for only one frame to be sent by the AP. The AP not having a large amount of data buffered might, for instance, result in the AP being able to send all of that data during a single TXOP.

Depicted, for instance, in FIG. 17 are Time_Prior 1701, UL TXOP 1703, DL TXOP 1705, DL_time_1 1707, DL_time_2 1709, and DL_time_3 1711. FIG. 17 corresponds to an exemplary case in which both UL and DL periods (TXOPs) 1703 and 1705 involve single frames from the WCD and the AP, and the AP ends the service period with DL transmission. Time_Prior 1701 might, for instance, be determined in a manner analogous to that discussed above.

The modem might, for example, enter the awake state and/or commence channel access in response to instruction that operation commence. Such instruction might, for instance, be implemented in a manner analogous to that discussed above. For example, a schedule signal (e.g., dispatched by the MRC) might go high. The schedule signal might, in various embodiments, be brought low at the end of the assigned time period. The schedule signal might, for example, be interpreted to indicate that operation commence when high and that operation terminate when low. As another example, the meanings of high and low might be flipped.

It is noted that although, in various embodiments, instruction that operation terminate might be dispatched at the end of the assigned time period (e.g., the schedule signal might be brought low), the assigned time period might, in various embodiments, include both uplink and downlink transmissions, and a Time_Posterior (e.g., implemented in a manner analogous to that discussed above) might come into play. Such a Time_Posterior might, for instance, be implemented from the point of view that there is no reasoned to send uplink data if there is no way to receive acknowledgement (e.g., due to the modem shutting down).

According to various embodiments of the present invention, functionality might be implemented so that downlink transmission operation starts as close as possible to the start of the assigned time period. Such functionality might, in various embodiments, involve the trigger frame be transmitted during one assigned time period and DL taking place during one or more other assigned time periods. It is noted that such functionality might, for instance, be employed to ensure that DL operation can be performed in situations where there is a substantial amount of information in the AP transmission buffer. In various embodiments, assigned time periods for UL might be more freely schedulable than assigned time periods for DL and/or DL TXOP timing might be controllable to some extent with UL scheduling.

Such functionality might be implemented in a number of ways. For example, the trigger frame might be sent in a previous assigned time period. It might, in various embodiments, be assumed that the channel contention for the AP takes a suitable amount of time so that the DL can commence near the start of the next assigned time period. Information regarding such an amount of time might, for instance be made available to the WCD by the AP. As another example, the trigger frame might be transmitted during a non-assigned time. Such functionality might, in various embodiments, take into account assumption that the transmission of the trigger frame does not interfere with other radio modalities and/or that the trigger frame is sent at a time period so that the estimated DL starts near the beginning of the next assigned time period.

With respect to FIG. 17 it is noted that the assigned time period might, in such embodiments, start at or near DL Tx (downlink transmission) 1717, with the trigger frame being sent at a time (e.g., at a time determined by the MRC) that allows for such positioning of DL Tx 1717. As alluded to above, assumption might, in various embodiments, be made that the trigger frame does not interfere with other radio modalities.

It is noted that, in various embodiments, the offset of DL operation timing (e.g., the start of DL TXOP 1705 of FIG. 17) from trigger frame transmission (e.g., UL Tx (uplink transmission) 1713 of FIG. 17) might be estimated (e.g., by the MRC) from information acquired from the modem and/or from upper layers in the WCD regarding DL access delay and/or service parameters currently valid in the modem. DL_timed 170_1 of FIG. 17, DL_time_2 1709 of FIG. 17, and/or their sum might, for instance, be measured in the modem and/or acquired from the AP. Delays might, for example, be represented in the form of histograms and/or delay distributions from which the probability of delays from the trigger frame to the start of the first DL transmission may be determined (e.g., by the MRC). DL_time_3 1711 of FIG. 17 values and/or related distribution might, for instance, be acquired from the modem. The modem might, for example, carry the required information and/or acquire the required information from one or more networks.

The foregoing information might, for instance, need to be given for each AC (e.g., due to access delays and/or DL TXOP lengths varying from one service class to another). Moreover, the foregoing information (e.g., per AC) might, for example, be employed (e.g., by the MRC) in estimating the DL operation timing offset. Such estimation might, for instance, take into account service parameters from higher layers of the WCD. The WCD might, for example, keep track of typical packet sizes received in the downlink direction. Typical operating time to the downlink direction might, for instance, be calculated from typical packet size, load, service, and/or data rate parameters.

According to various embodiments of the present invention, in the service period scheme it might be up to the AP to decide when to end the service period and/or how many DL TXOPs to run before letting the WCD sleep. Multiple TXOPs might, for instance, be employed and/or required in the case of non-real time services and/or non-constant data exchange (e.g., web browsing), and/or where the AP has a large amount of data buffered. The AP having a large amount of data to send might, for instance, result in the AP not being able to send all of the data during a single TXOP, with the AP, for example, performing one or more channel contentions and/or sending the data over multiple TXOPs.

Figure 18:
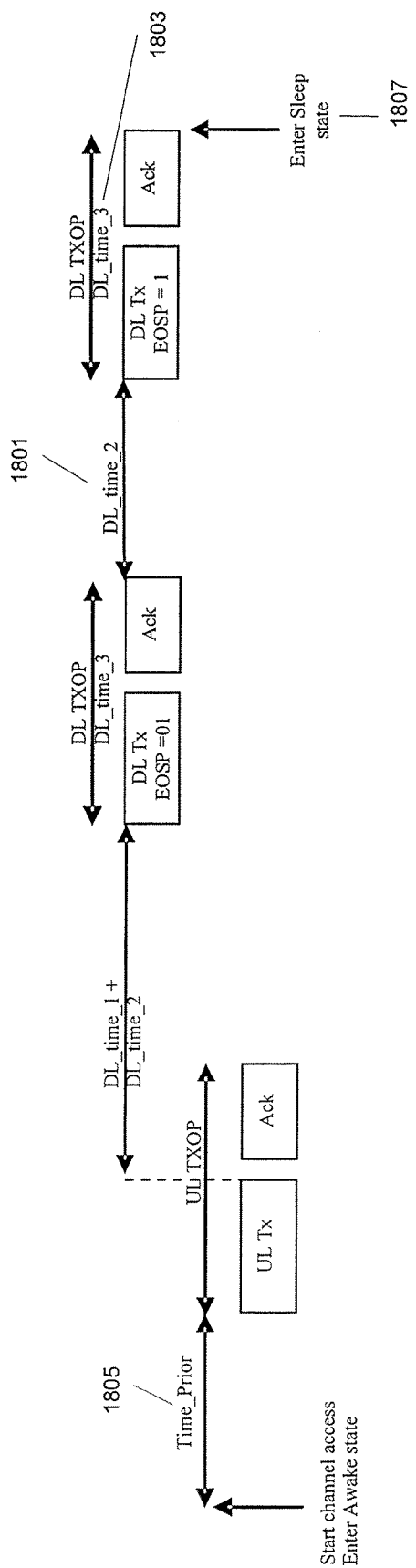
FIG. 18 discloses further exemplary aspects of downlink operations in accordance with at least one embodiment of the present invention.

Shown in FIG. 18 are further exemplary aspects of DL operations according to various embodiments of the present invention. With respect to FIG. 18 it is noted that, in the case of multiple TXOPs, operations (e.g., scheduling operations) might be performed (e.g., by the MRC) in a manner analogous to that discussed above, but perhaps further taking into account multiple access delays (e.g., DL_time_2 1801) and/or TXOP lengths (e.g., DL_time_3 1803). It is noted that an assigned time period might, in various embodiments, start at or near the end of Time_Prior 1805 and end at or near "Enter sleep state" 1807.

With reference to the discussed MRC functionality it is noted that the MRC might, in various embodiments, be implemented via one or more software modules (e.g., running on a WCD). It is further noted that, in various embodiments, the MRC might be implemented in hardware (e.g., via one or more integrated circuits). For instance, in various embodiments various MRC functionality discussed herein might be performed by specialized hardware, and/or otherwise not by one or more general purpose processors. One or more chips and/or chipsets might, in various embodiments, be employed. In various embodiments, one or more ASICs might be employed.

It will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
assigning a communication time period to a first radio modality of a device, wherein the first radio modality of the device is allowed to perform one or more of data transmission and data reception within the assigned communication time period, and wherein the device has two or more radio modalities;
estimating a time required by the first radio modality of the device to perform channel contention for accessing a wireless medium;
calculating, using the estimated time, a time prior to start of the assigned communication time period, wherein the calculated time prior to start of the assigned communication time period is within a time period assigned to a second radio modality of the device; and
dispatching instruction that the first radio modality of the device, at the calculated time prior to start of the assigned communication time period, can commence operations, wherein channel contention corresponding to the first radio modality of the device is initiated in response to the dispatched instruction.

2. The method of claim 1, further comprising:

dispatching instruction that the first radio modality of the device, at a time prior to an end of the assigned communication time period, can terminate operations, wherein the time prior to the end of the assigned communication time period is selected so that no data uplink corresponding to the first radio modality of the device is performed subsequent to the assigned communication time period.

3. The method of claim 2, wherein the selected time is prior to an end of the assigned communication time period by a calculated amount, wherein calculation of the amount takes into account one or more uplink access delays.

4. The method of claim 3, wherein one or more of the uplink access delays are one or more of measured and pre-stored.

5. The method of claim 2, wherein the selected time is prior to an end of the assigned communication time period by a calculated amount, wherein calculation of the amount takes into account one or more enhanced distributed coordination function channel access parameters.

6. The method of claim 2, wherein the selected time is prior to an end of the assigned communication time period by a calculated amount, wherein calculation of the amount takes into account one or more of:
one or more service priorities, and
one or more service parameters.

7. The method of claim 1, wherein the time prior to start of the assigned communication time period is selected so that data uplink corresponding to the first radio modality of the device is performed within the assigned communication time period.

8. The method of claim 7, wherein the time prior to start of the assigned communication time period is selected so that data uplink corresponding to the first radio modality of the device is initiated near the start of the assigned communication time period.

9. The method of claim 8, wherein the selected time is prior to start of the assigned communication time period by a calculated amount, wherein calculation of the amount takes into account one or more uplink access delays.

10. The method of claim 9, wherein one or more of the uplink access delays are one or more of measured and pre-stored.

11. The method of claim 8, wherein the selected time is prior to start of the assigned communication time period by a calculated amount, wherein calculation of the amount takes into account one or more enhanced distributed coordination function channel access parameters.

12. The method of claim 8, wherein the time is prior to start of the communication time period by a calculated amount, wherein calculation of the amount takes into account one or more of:
one or more service priorities, and
one or more service parameters.

13. A method, comprising:

assigning a communication time period to a first radio modality of a device, wherein the first radio modality of the device is allowed to perform one or more of data transmission and data reception within the assigned communication time period, and wherein the device has two or more radio modalities;

estimating a time required by the first radio modality of the device to perform channel contention for accessing a wireless medium;

calculating, using the estimated time, a time prior to start of the assigned communication time period, wherein the calculated time prior to start of the assigned communication time period is within a time period assigned to a second radio modality of the device; and dispatching instruction that the first radio modality of the device, at the calculated time prior to start of the assigned communication time period, can commence operations, wherein channel contention corresponding to the first radio modality of the device is initiated in response to the dispatched instruction, and wherein the time prior to start of the assigned communication time period is selected so that an uplink operation triggering downlink is sent within the assigned communication time period.

14. The method of claim 13, wherein the time prior to start of the assigned communication time period is selected so that data downlink corresponding to the first radio modality of the device is performed within the assigned communication time period.

15. The method of claim 13, wherein the selected time is prior to start of the assigned communication time period by a calculated amount, wherein calculation of the amount takes into account one or more uplink access delays.

16. The method of claim 15, wherein one or more of the uplink access delays are one or more of measured and pre-stored.

17. The method of claim 13, wherein the selected time is prior to start of the assigned communication time period by a calculated amount, wherein calculation of the amount takes into account one or more enhanced distributed coordination function channel access parameters.

18. The method of claim 13, wherein the selected time is prior to start of the assigned communication time period by a calculated amount, wherein calculation of the amount takes into account one or more of:
one or more service priorities, and
one or more service parameters.

19. A method, comprising:

assigning a communication time period to a first radio modality of a device, wherein the first radio modality of the device is allowed to perform one or more of data transmission and data reception within the assigned communication time period, and wherein the device has two or more radio modalities;

estimating a time required by the first radio modality of the device to perform channel contention for accessing a wireless medium;

calculating, using the estimated time, a time prior to start of the assigned communication time period, wherein the calculated time prior to start of the assigned communication time period is within a time period assigned to a second radio modality of the device; and dispatching instruction that the first radio modality of the device, at the calculated time prior to start of the assigned communication time period, can commence operations, wherein channel contention corresponding to the first radio modality of the device is initiated in response to the dispatched instruction, and wherein the time prior to start of the assigned communication time period is selected so that an uplink operation triggering downlink is sent prior to the assigned communication time period.

20. The method of claim 19, wherein the uplink operation triggering downlink is sent within a previous assigned communication time period.

21. The method of claim 19, wherein the uplink operation triggering downlink is sent during non-assigned time.

22. The method of claim 19, wherein the time prior to start of the assigned communication time period is selected so that the downlink is performed within the assigned communication time period.

23. The method of claim 19, wherein the time prior to start of the assigned communication time period is selected so that the downlink is initiated near the start of the assigned communication time period.

24. An apparatus, comprising:
at least one processor; and
at least one memory including computer program code, the at least one memory and the computer program code configured to, with the at least one processor, cause the apparatus at least to perform:
assign a communication time period to a first radio modality of the apparatus, wherein the first radio modality of the apparatus is allowed to perform one or more of data transmission and data reception within the assigned communication time period, and wherein the apparatus has two or more radio modalities;
estimate a time required by the first radio modality of the apparatus to perform channel contention for accessing a wireless medium;
calculate, using the estimated time, a time prior to start of the assigned communication time period, wherein the calculated time prior to start of the assigned communication time period is within a time period assigned to a second radio modality of the apparatus; and
dispatch instruction that the first radio modality of the apparatus, at the calculated time prior to start of the assigned communication time period, can commence operations,
wherein channel contention corresponding to the first radio modality of the apparatus is initiated in response to the dispatched instruction.

25. The apparatus of claim 24, wherein the at least one memory and the computer program code are further configured to, with the at least one processor, cause the apparatus to:
dispatch instruction that the first radio modality of the apparatus, at a time prior to an end of the assigned communication time period, can terminate operations,
wherein the time prior to the end of the assigned communication time period is selected so that no data uplink corresponding to the first radio modality of the apparatus is performed subsequent to the assigned communication time period.

26. The apparatus of claim 24, wherein the time prior to start of the assigned communication time period is selected so that data uplink corresponding to the first radio modality of the apparatus is performed within the assigned communication time period.

27. The apparatus of claim 26, wherein the time prior to start of the assigned communication time period is selected so that data uplink corresponding to the first radio modality of the apparatus is initiated near the start of the assigned communication time period.

28. The apparatus of claim 27, wherein the selected time is prior to start of the assigned communication time period by a calculated amount, wherein calculation of the amount takes into account one or more uplink access delays.

29. The apparatus of claim 28, wherein one or more of the uplink access delays are one or more of measured and pre-stored.

30. The apparatus of claim 27, wherein the selected time is prior to start of the assigned communication time period by a calculated amount, wherein calculation of the amount takes into account one or more enhanced distributed coordination function channel access parameters.

31. The apparatus of claim 27, wherein the time is prior to start of the communication time period by a calculated amount, wherein calculation of the amount takes into account one or more of:
one or more service priorities, and
one or more service parameters.

32. The apparatus of claim 27, wherein the selected time is prior to an end of the assigned communication time period by a calculated amount, wherein calculation of the amount takes into account one or more uplink access delays.

33. The apparatus of claim 32, wherein one or more of the uplink access delays are one or more of measured and pre-stored.

34. The apparatus of claim 27, wherein the selected time is prior to an end of the assigned communication time period by a calculated amount, wherein calculation of the amount takes into account one or more enhanced distributed coordination function channel access parameters.

35. The apparatus of claim 27, wherein the selected time is prior to an end of the assigned communication time period by a calculated amount, wherein calculation of the amount takes into account one or more of:
one or more service priorities, and
one or more service parameters.

36. An apparatus, comprising:
at least one processor; and
at least one memory including computer program code, the at least one memory and the computer program code configured to, with the at least one processor, cause the apparatus at least to perform:
assign a communication time period to a first radio modality of the apparatus, wherein the first radio modality of the apparatus is allowed to perform one or more of data transmission and data reception within the assigned communication time period, and wherein the apparatus has two or more radio modalities;
estimate a time required by the first radio modality of the apparatus to perform channel contention for accessing a wireless medium;
calculate, using the estimated time, a time prior to start of the assigned communication time period, wherein the calculated time prior to start of the assigned communication time period is within a time period assigned to a second radio modality of the apparatus; and
dispatch instruction that the first radio modality of the apparatus, at the calculated time prior to start of the assigned communication time period, can commence operations,
wherein channel contention corresponding to the first radio modality of the apparatus is initiated in response to the dispatched instruction, and
wherein the time prior to start of the assigned communication time period is selected so that an uplink operation triggering downlink is sent within the assigned communication time period.

37. The apparatus of claim 36, wherein the time prior to start of the assigned communication time period is selected so that data downlink corresponding to the first radio modality of the apparatus is performed within the assigned communication time period.

38. The apparatus of claim 36, wherein the selected time is prior to start of the assigned communication time period by a calculated amount, wherein calculation of the amount takes into account one or more uplink access delays.

39. The apparatus of claim 38, wherein one or more of the uplink access delays are one or more of measured and pre-stored.

40. The apparatus of claim 36, wherein the selected time is prior to start of the assigned communication time period by a calculated amount, wherein calculation of the amount takes into account one or more enhanced distributed coordination function channel access parameters.

41. The apparatus of claim 36, wherein the selected time is prior to start of the assigned communication time period by a calculated amount, wherein calculation of the amount takes into account one or more of:
one or more service priorities, and
one or more service parameters.

42. An apparatus, comprising:
at least one processor; and
at least one memory including computer program code, the at least one memory and the computer program code configured to, with the at least one processor, cause the apparatus at least to perform:
assign a communication time period to a first radio modality of the apparatus, wherein the first radio modality of the apparatus is allowed to perform one or more of data transmission and data reception within the assigned communication time period, and wherein the apparatus has two or more radio modalities;
estimate a time required by the first radio modality of the apparatus to perform channel contention for accessing a wireless medium;
calculate, using the estimated time, a time prior to start of the assigned communication time period, wherein the calculated time prior to start of the assigned communication time period is within a time period assigned to a second radio modality of the apparatus; and
dispatch instruction that the first radio modality of the apparatus, at the calculated time prior to start of the assigned communication time period, can commence operations,
wherein channel contention corresponding to the first radio modality of the apparatus is initiated in response to the dispatched instruction, and
wherein the time prior to start of the assigned communication time period is selected so that an uplink operation triggering downlink is sent prior to the assigned communication time period.

43. The apparatus of claim 42, wherein the uplink operation triggering downlink is sent within a previous assigned communication time period.

44. The apparatus of claim 42, wherein the uplink operation triggering downlink is sent during non-assigned time.

45. The apparatus of claim 42, wherein the time prior to start of the assigned communication time period is selected so that the downlink is performed within the assigned communication time period.

46. The apparatus of claim 42, wherein the time prior to start of the assigned communication time period is selected so that the downlink is initiated near the start of the assigned communication time period.

47. A computer program product comprising computer executable program code recorded on a non-transitory computer readable storage medium, the computer executable program code comprising:
code for causing assignment of a communication time period to a first radio modality of an apparatus, wherein the first radio modality of the apparatus is allowed to perform one or more of data transmission and data reception within the assigned communication time period, and wherein the apparatus has two or more radio modalities;
code for causing estimation of a time required by the first radio modality of the apparatus to perform channel contention for accessing a wireless medium;
code for causing calculation, using the estimated time, of a time prior to start of the assigned communication time period, wherein the calculated time prior to start of the assigned communication time period is within a time period assigned to a second radio modality of the apparatus; and
code for causing dispatch of instruction that the first radio modality of the apparatus, at the calculated time prior to start of the assigned communication time period, can commence operations,
wherein channel contention corresponding to the first radio modality of the apparatus is initiated in response to the dispatched instruction.

48. A computer program product comprising computer executable program code recorded on a non-transitory computer readable storage medium, the computer executable program code comprising:
code for causing assignment of a communication time period to a first radio modality of an apparatus, wherein the first radio modality of the apparatus is allowed to perform one or more of data transmission and data reception within the assigned communication time period, and wherein the apparatus has two or more radio modalities;
code for causing estimation of a time required by the first radio modality of the apparatus to perform channel contention for accessing a wireless medium;
code for causing calculation, using the estimated time, of a time prior to start of the assigned communication time period, wherein the calculated time prior to start of the assigned communication time period is within a time period assigned to a second radio modality of the apparatus; and
code for causing dispatch of instruction that the first radio modality of the apparatus, at the calculated time prior to start of the assigned communication time period, can commence operations,
wherein channel contention corresponding to the first radio modality of the apparatus is initiated in response to the dispatched instruction, and
wherein the time prior to start of the assigned communication time period is selected so that an uplink operation triggering downlink is sent within the assigned communication time period.

49. A computer program product comprising computer executable program code recorded on a non-transitory computer readable storage medium, the computer executable program code comprising:
code for causing assignment of a communication time period to a first radio modality of an apparatus, wherein the first radio modality of the apparatus is allowed to perform one or more of data transmission and data reception within the assigned communication time period, and wherein the apparatus has two or more radio modalities;

code for causing estimation of a time required by the first radio modality of the apparatus to perform channel contention for accessing a wireless medium;

code for causing calculation, using the estimated time, of a time prior to start of the assigned communication time period, wherein the calculated time prior to start of the assigned communication time period is within a time period assigned to a second radio modality of the apparatus; and code for causing dispatch of instruction that the first radio modality of the apparatus, at the calculated time prior to start of the assigned communication time period, can commence operations, wherein channel contention corresponding to the first radio modality of the apparatus is initiated in response to the dispatched instruction, and wherein the time prior to start of the assigned communication time period is selected so that an uplink operation triggering downlink is sent prior to the assigned communication time period.

50. At least one integrated circuit, comprising:

chip circuitry configured at least to perform:

assign a communication time period to a first radio modality of a device, wherein the first radio modality of the device is allowed to perform one or more of data transmission and data reception within the assigned communication time period, and wherein the device has two or more radio modalities;

estimate a time required by the first radio modality of the device to perform channel contention for accessing a wireless medium;

calculate, using the estimated time, a time prior to start of the assigned communication time period, wherein the calculated time prior to start of the assigned communication time period is within a time period assigned to a second radio modality of the device; and dispatch instruction that the first radio modality of the device, at the calculated time prior to start of the assigned communication time period, can commence operations, wherein channel contention corresponding to the first radio modality of the device is initiated in response to the dispatched instruction.

51. At least one integrated circuit, comprising:

chip circuitry configured at least to perform:

assign a communication time period to a first radio modality of a device, wherein the first radio modality of the device is allowed to perform one or more of data transmission and data reception within the assigned communication time period, and wherein the device has two or more radio modalities;

estimate a time required by the first radio modality of the device to perform channel contention for accessing a wireless medium;

calculate, using the estimated time, a time prior to start of the assigned communication time period, wherein the calculated time prior to start of the assigned communication time period is within a time period assigned to a second radio modality of the device; and dispatch instruction that the first radio modality of the device, at the calculated time prior to start of the assigned communication time period, can commence operations, wherein channel contention corresponding to the first radio modality of the device is initiated in response to the dispatched instruction, and wherein the time prior to start of the assigned communication time period is selected so that an uplink operation triggering downlink is sent within the assigned communication time period.

52. At least one integrated circuit, comprising:

chip circuitry configured at least to perform:

assign a communication time period to a first radio modality of a device, wherein the first radio modality of the device is allowed to perform one or more of data transmission and data reception within the assigned communication time period, and wherein the device has two or more radio modalities;

estimate a time required by the first radio modality of the device to perform channel contention for accessing a wireless medium;

calculate, using the estimated time, a time prior to start of the assigned communication time period, wherein the calculated time prior to start of the assigned communication time period is within a time period assigned to a second radio modality of the device; and dispatch instruction that the first radio modality of the device, at the calculated time prior to start of the assigned communication time period, can commence operations, wherein channel contention corresponding to the first radio modality of the device is initiated in response to the dispatched instruction, and wherein the time prior to start of the assigned communication time period is selected so that an uplink operation triggering downlink is sent prior to the assigned communication time period.

* * * * *